United States Patent
Eldred et al.

(10) Patent No.: US 10,118,863 B2
(45) Date of Patent: *Nov. 6, 2018

(54) PROPPANT PARTICLES FORMED FROM SLURRY DROPLETS AND METHODS OF USE

(71) Applicant: CARBO CERAMICS INC., Houston, TX (US)

(72) Inventors: Benjamin T. Eldred, Houston, TX (US); Brett A. Wilson, Cypress, TX (US); Clayton F. Gardinier, Houston, TX (US); Robert Duenckel, Colorado Springs, CO (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,771

(22) Filed: May 30, 2017

(65) Prior Publication Data
US 2017/0260104 A1    Sep. 14, 2017

Related U.S. Application Data

(63) Continuation of application No. 14/502,483, filed on Sep. 30, 2014, now Pat. No. 9,670,400, which is a continuation-in-part of application No. 13/608,530, filed on Sep. 10, 2012, now Pat. No. 8,883,693, which is a continuation-in-part of application No. 13/357,141, filed on Jan. 24, 2012, now Pat. No. 8,865,631, which is a continuation-in-part of application No. 13/045,980, filed on Mar. 11, 2011, now Pat. No. 9,175,210.

(51) Int. Cl.
| | |
|---|---|
| *C09K 8/80* | (2006.01) |
| *C04B 38/00* | (2006.01) |
| *C09K 8/62* | (2006.01) |
| *C04B 33/04* | (2006.01) |
| *C04B 35/111* | (2006.01) |
| *C04B 35/626* | (2006.01) |
| *C04B 35/636* | (2006.01) |
| *C09K 8/68* | (2006.01) |
| *C09K 8/70* | (2006.01) |
| *C04B 40/00* | (2006.01) |

(52) U.S. Cl.
CPC .......... *C04B 38/0009* (2013.01); *C04B 33/04* (2013.01); *C04B 35/1115* (2013.01); *C04B 35/62695* (2013.01); *C04B 35/636* (2013.01); *C09K 8/62* (2013.01); *C09K 8/68* (2013.01); *C09K 8/70* (2013.01); *C09K 8/80* (2013.01); *C04B 40/00* (2013.01); *C04B 2235/3217* (2013.01); *C04B 2235/349* (2013.01); *C04B 2235/5436* (2013.01); *C04B 2235/6023* (2013.01); *C04B 2235/95* (2013.01); *C04B 2235/963* (2013.01); *C09K 2200/026* (2013.01); *Y10T 428/2982* (2015.01)

(58) Field of Classification Search
CPC ........ E21B 43/26; E21B 43/16; E21B 43/267; E21B 44/00; E21B 43/25; E21B 47/00; E21B 33/12; E21B 33/138; E21B 34/063; E21B 47/06; E21B 34/12; E21B 43/14; E21B 47/065; E21B 47/12; E21B 2034/007; E21B 37/06; E21B 43/164; E21B 43/20; E21B 43/24; E21B 43/30; E21B 43/34; E21B 47/1015; E21B 17/028; E21B 19/22; E21B 2021/006; E21B 2034/002; E21B 2034/005; E21B 21/08; E21B 21/16; C09K 8/03; C09K 8/032; C09K 8/12; C09K 8/42; C09K 8/516; C09K 8/524; C09K 8/582; C09K 8/588; C09K 8/72; C09K 8/725; C09K 8/845; C09K 8/86; C09K 8/92; C09K 2208/12; C09K 2208/20
See application file for complete search history.

(56) References Cited

U.S. PATENT DOCUMENTS

| | | |
|---|---|---|
| 2,596,843 A | 5/1952 | Farris |
| 2,596,844 A | 5/1952 | Clark |
| 4,427,068 A | 1/1984 | Fitzgibbon |
| 4,440,866 A | 4/1984 | Lunghofer et al. |

(Continued)

FOREIGN PATENT DOCUMENTS

| | | |
|---|---|---|
| EP | 0116369 A2 | 8/1984 |
| WO | 9207653 A1 | 5/1992 |
| WO | 92302785 | 2/1993 |

OTHER PUBLICATIONS http://www.showmegold.org/news/Mesh.htm downloaded on Jun. 3, 2016.*
Brace Gmbh, "Microsphere Units", retrieved Jan. 21, 2011, http://brace.de/PagEd-index-topic id-3-page id-46.phtml.
Brace Gmbh, "Microspheres Technology and Applications" brochure, copyright 2000, 4 pages.
Brace Gmbh, "Spherisator S", retrieved Jan. 21, 2011, http://www.de.PagEd-index-topic id-3-page-108.phtml.
Guimard, Pierre, et al., "Correlation of Surface Roughness and Pressure Drop Flow Through Packed Beds", 06-363 Transport Process Laboratory, Carnegie Mellon University, May 4, 2004.

(Continued)

*Primary Examiner* — Kumar R Bhushan
(74) *Attorney, Agent, or Firm* — Patterson + Sheridan, LLP

(57) ABSTRACT

Proppant particles formed from slurry droplets and methods of use are disclosed herein. The proppant particles can include a sintered ceramic material and can have a size of about 80 mesh to about 10 mesh and an average largest pore size of less than about 20 microns. The methods of use can include injecting a hydraulic fluid into a subterranean formation at a rate and pressure sufficient to open a fracture therein and injecting a fluid containing a proppant particle into the fracture, the proppant particle including a sintered ceramic material, a size of about 80 mesh to about 10 mesh, and an average largest pore size of less than about 20 microns.

23 Claims, 16 Drawing Sheets

(56) References Cited

U.S. PATENT DOCUMENTS

| | | | | |
|---|---|---|---|---|
| 4,639,427 A | * | 1/1987 | Khaund | C04B 35/18 166/280.2 |
| 4,657,754 A | * | 4/1987 | Bauer | C01F 7/441 264/125 |
| 4,713,203 A | * | 12/1987 | Andrews | C04B 35/10 166/280.2 |
| 4,894,285 A | | 1/1990 | Fitzgibbob | |
| 5,021,201 A | | 6/1991 | Eguchi et al. | |
| 5,114,695 A | | 5/1992 | Jain et al. | |
| 5,420,086 A | | 5/1995 | Brandau et al. | |
| 5,472,648 A | | 12/1995 | Alisch et al. | |
| 5,500,162 A | | 3/1996 | Theisen et al. | |
| 5,833,361 A | | 11/1998 | Funk | |
| 6,197,073 B1 | | 3/2001 | Kadner et al. | |
| 6,753,299 B2 | | 6/2004 | Lunghofer et al. | |
| 7,036,591 B2 | | 5/2006 | Cannan et al. | |
| 7,160,844 B2 | | 1/2007 | Urbanek | |
| 7,678,723 B2 | | 3/2010 | Duenckel et al. | |
| 7,776,255 B1 | * | 8/2010 | Wedding | B22F 1/0051 419/29 |
| 7,825,053 B2 | | 11/2010 | Duenckel et al. | |
| 8,865,631 B2 | * | 10/2014 | Eldred | C09K 8/805 507/211 |
| 8,883,693 B2 | * | 11/2014 | Eldred | C09K 8/80 507/211 |
| 9,175,210 B2 | * | 11/2015 | Eldred | C09K 8/805 |
| 9,670,400 B2 | * | 6/2017 | Eldred | C09K 8/80 |
| 2003/0099740 A1 | * | 5/2003 | Colle | A23G 4/064 426/3 |
| 2004/0007789 A1 | * | 1/2004 | Vlach | B01J 2/06 264/8 |
| 2005/0096207 A1 | | 5/2005 | Urbanek | |
| 2006/0016598 A1 | | 1/2006 | Urbanek | |
| 2006/0081371 A1 | * | 4/2006 | Duenckel | C09K 8/80 166/280.2 |
| 2006/0162929 A1 | * | 7/2006 | Urbanek | C04B 35/443 166/280.2 |
| 2007/0036977 A1 | * | 2/2007 | Sinclair | C09K 8/805 428/403 |
| 2007/0144736 A1 | | 6/2007 | Shinbach et al. | |
| 2008/0015103 A1 | | 1/2008 | Luscher et al. | |
| 2008/0058228 A1 | * | 3/2008 | Wilson | C04B 33/04 507/140 |
| 2008/0087429 A1 | * | 4/2008 | Brannon | C09K 8/62 166/280.1 |
| 2008/0135245 A1 | * | 6/2008 | Smith | C04B 35/04 166/280.2 |
| 2008/0182765 A1 | | 7/2008 | Pershikova et al. | |
| 2008/0210421 A1 | | 9/2008 | Wilson et al. | |
| 2008/0220996 A1 | | 9/2008 | Duenckel et al. | |
| 2008/0234146 A1 | | 9/2008 | Barmatov et al. | |
| 2008/0241540 A1 | * | 10/2008 | Canova | B01D 1/18 428/402 |
| 2009/0038797 A1 | * | 2/2009 | Skala | C09K 8/80 166/280.1 |
| 2009/0044941 A1 | * | 2/2009 | De Paiva Cortes | C04B 35/10 166/280.1 |
| 2009/0118145 A1 | * | 5/2009 | Wilson | C09K 8/80 507/276 |
| 2009/0188145 A1 | | 7/2009 | Fluhr et al. | |
| 2009/0205824 A1 | * | 8/2009 | Sullivan | C09K 8/512 166/278 |
| 2009/0205826 A1 | * | 8/2009 | Rodriguez | C09K 8/80 166/280.2 |
| 2009/0227480 A1 | | 9/2009 | de Paiva Cortes et al. | |
| 2010/0126728 A1 | | 5/2010 | Duenckel et al. | |
| 2011/0220348 A1 | * | 9/2011 | Jin | E21B 17/042 166/244.1 |
| 2012/0000653 A1 | | 1/2012 | Panga et al. | |
| 2012/0018162 A1 | | 1/2012 | Tanguay et al. | |
| 2012/0157358 A1 | * | 6/2012 | Fang | E21B 43/267 507/269 |
| 2012/0190597 A1 | | 7/2012 | Chatterjee et al. | |
| 2012/0227968 A1 | * | 9/2012 | Eldred | C09K 8/805 166/280.2 |
| 2012/0231981 A1 | | 9/2012 | Eldred et al. | |
| 2013/0025862 A1 | * | 1/2013 | Eldred | C09K 8/80 166/280.2 |
| 2013/0081812 A1 | | 4/2013 | Green et al. | |
| 2015/0166880 A1 | * | 6/2015 | Eldred | C09K 8/80 166/280.2 |

OTHER PUBLICATIONS http://en.wiktionary.org/windex.php? Title_reactant&printable+yes downloaded on Jul. 15, 2014.

http://water.me.vccs.edu/concepts/coagulantchemicals.html downloaded on 7115/2014.

International Search Report and Written Opinion of the International Searching Authority for PCT/US2013/058763 dated Jan. 22, 2014, 17 pgs.

International Search Report and Written Opinion of the International Searching Authority for PCT/US2012/028308 dated Aug. 16, 2012, 16 pages.

Office Action and Search Report for Chinese Patent Application No. 201280012640.3 dated Apr. 15, 2015, 22 pages.

Office Action for Chinese Patent Application No. 201280012640.3 dated Aug. 28, 2014, 5 pages.

Supplemental European Search Report and European Search Opinion for EP Application No. 12758225.2 dated Sep. 15, 2014, 8 pages.

Yaparpalvi, R. et al., "Drop Formation under Pulsed Conditions", Chemical Engineering Science, vol. 41, No. 10, pp. 2547-2553, 1986.

Zainuddin, M. Imran, et al., "Correlation between slurry properties and structures and properties of granules", Journal of the European Ceramic Society 30, 2010, pp. 3291-3296.

\* cited by examiner

PROPPANT PARTICLES FORMED FROM SLURRY DROPLETS AND METHODS OF USE

This application is a Continuation of U.S. patent application Ser. No. 14/502,483, filed Sep. 30, 2014, which is a Continuation-in-Part of U.S. patent application Ser. No. 13/608,530, filed Sep. 10, 2012, which is a Continuation-in-Part of U.S. patent application Ser. No. 13/357,141, filed Jan. 24, 2012, which is a Continuation-in-Part of U.S. patent application Ser. No. 13/045,980, filed Mar. 11, 2011. The above referenced applications are hereby incorporated by reference in their entirety.

TECHNICAL FIELD

This invention relates to hydraulic fracturing of subterranean formations in the earth. More particularly, sintered ceramic proppant particles formed from vibration-induced dripping from a nozzle of a slurry of finely-divided ceramic material are provided, along with methods of use of the particles.

BACKGROUND

Hydraulic fracturing is a process of pumping liquids down a well and into a subterranean formation at high rate and pressure, such that a fracture is formed in the rock around the well. After pumping a liquid volume sufficient to widen the fracture adequately, solid particles, called "proppant," are added to the liquid. After pumping is completed, the well is opened for production of hydrocarbons. The production rate of fluid from the well is usually significantly increased after the fracturing treatment. Vast improvements in the hydraulic fracturing process have been developed since the process was originally patented in 1949 (U.S. Pat. Nos. 2,596,843 and 2,596,844).

The material first used for proppant in hydraulic fracturing of wells was silica sand. As wells became deeper, sand was found to have inadequate strength. In deep wells, stress of the earth causes the sand to crush and become much less effective in increasing the production rate of a well.

Synthetic proppant materials were developed to provide higher strength proppants. The original synthetic sintered proppant was sintered bauxite. In later years, a variety of ceramic raw materials have been used to make sintered ceramic proppants, including bauxite containing lesser amounts of alumina and clay minerals, such as kaolin. Generally, it has been found that the strength of ceramic particles increases with the amount of aluminum oxide (alumina) in the particle, all other factors remaining constant.

A general procedure for making synthetic proppant particles is to obtain the ceramic raw material, grind it to a fine powder, form it into pellets (called "green" pellets), and sinter the green pellets in a kiln. The final product is ceramic pellets in the size range suitable for proppants, from about 70 mesh to 12 mesh (0.008 inch to 0.067 inch in diameter). Different sizes of pellets are used depending on well conditions.

A variety of processes for forming the pellets of a proppant have been proposed. In early work, U.S. Pat. No. 4,427,068 describes a process for forming sintered ceramic pellets by adding dry powders of clay and alumina, bauxite, or mixtures to a high intensity mixer (hereinafter referred to as "dry mixing method"). Powdered fine grain ceramic starting ingredients (ceramic raw materials) are stirred to form a dry homogenous mixture. Then, sufficient water is added to cause agglomeration of the fine starting dust particles to form small composite spherical pellets from the powder. Continued mixing time is allowed in order to grow small pellets to the desired size. A broad range of sizes is produced during the pellet-forming stage. A preferred mixing device is obtained from Eirich Machines, Inc., and is known as the Eirich mixer. The resulting pellets are dried and sintered into the final proppant particles. Much of the ceramic proppant made in industry in past years has been made with this process of forming pellets.

U.S. Pat. No. 4,440,866 discloses an alternative process for producing pellets that are sintered to produce high strength pellets. A continuous spray/granulation of an aqueous aluminous ore suspension with binder is used to form granules that are subsequently sintered (hereinafter referred to as "spray fluidized bed method"). All steps of this process may be carried out in a continuous manner. An aqueous suspension containing the ceramic raw material is continuously atomized and fed into a layer of already partially dried small starting dust particles (often called seeds) that are fluidized in a stream of hot drying air. The aqueous ceramic raw material suspension is continuously sprayed and dried onto the seed particles until the desired finished green particle diameter is achieved. Particles produced in this process have a size range that is less broad than those typically produced by the dry mixing method of U.S. Pat. No. 4,427,068 but are still of sufficient variation as to require further processing. Particles are continuously recovered from the fluidized layer and particles of the desired size are separated from oversized and undersized product fractions. Material is continuously recycled in the stream of drying air. This spray fluidized bed process has also been used to produce large amounts of ceramic proppants in industry.

The pellet-forming methods described above have intrinsic limitations. The dry mixing process produces an extremely wide range of green pellet sizes due to the random nature of the agitation of the rotor and pan. The spray fluidized bed process produces a somewhat tighter green pellet size distribution but still a much wider distribution than desired. These processes require extensive screening and recycling during the manufacturing process. Under the best manufacturing conditions about 30% of green particles must be recycled through the pellet-forming process. Both the dry mixing and spray fluidized bed processes also produce a random distribution of pore sizes in pellets, including a small percentage of very large pores that significantly degrade pellet strength. Strength of the sintered pellets is a primary consideration, because if the pellets break under high stress in a fracture, the flow capacity of the fracture is decreased and the hydraulic fracturing treatment is less effective. The sphericity and surface smoothness of particles produced by these processes are also important, with high sphericity and a very smooth surface traditionally being most desirable. All of these characteristics are strongly affected by the pellet-forming method.

U.S. Pub. No. 2006/0016598 discloses a list of pellet-forming techniques that may be used for ceramic proppant formation, including agglomeration, spray granulation, wet granulation, extruding and pelletizing, vibration induced dripping according to U.S. Pat. No. 5,500,162, spray nozzle-formed droplets and selective agglomeration. U.S. Pat. No. 5,500,162 discloses producing microspheres by vibration-provoked dripping of a chemical solution through a nozzle plate, wherein the falling drops form an envelope surrounded from all sides by flowing reaction gas. The liquid chemical solution has no or low (i.e., 20% or less) solid particles at the time it enters the nozzle plate, exits the nozzle plate, and passes through the first free fall section. The reaction gas is required to cause the precipitation (gelling) of small solid particles (typically sub-micron) in the liquid drops as they fall through the second free fall zone, and thereafter fall into a reaction liquid to further gel. The reaction gas is necessary to cause the liquid to partially gel prior to entering the reaction liquid, and the droplets are decelerated into the liquid through a foam or the reaction liquid is directed onto the falling drops tangentially in the same direction in which the droplets are falling. These two features of falling through reaction gas and decelerating the droplets into foam are required to insure the droplets are partially gelled during a sol-gel reaction and therefore not deformed, for example flattened, when they strike the reaction liquid. The reaction gas is sucked away inside or outside the envelope. The method according to the invention can be used to produce, for example, aluminum oxide spheres up to the diameter of 5 mm.

Vibration-induced dripping, herein called "drip casting," was originally developed to produce nuclear fuel pellets. Since then it has been adapted to produce a very wide variety of metal and ceramic "microspheres," such as grinding media and catalyst supports. Primarily, it has been used in the food and pharmaceuticals industries. The drip casting process is described on the website and in sales literature of Brace GmbH. Examples of microspheres formed by drip casting of different materials are also provided. U.S. Pat. No. 6,197,073 discloses a process for producing aluminum oxide beads from an acid aluminum oxide sol or acid aluminum oxide suspension by flowing the suspension through a vibrating nozzle plate to form droplets and pre-solidifying the droplets with gaseous ammonia and then coagulating the droplets in an ammonia solution. The mechanical strength of ceramic particles formed by sintering the drip cast particles was not a factor in any of the materials used in these references.

It is known that to produce ceramic proppant particles having maximum strength for a given ceramic material, the particles must contain minimum porosity, and the pores present must be kept as small as possible, since the strength of a given proppant particle is limited by its largest pore. What is needed is a method of forming green ceramic particles that can be fired to have reduced pore size and therefore maximum strength for use as a proppant. Preferably, the particles should be spherical, have a smooth surface and have uniform size. A method for forming the green particles without recycling of the undesired size fraction of green ceramic pellets is also needed.

BRIEF SUMMARY OF THE INVENTION

A proppant particle is disclosed herein. The proppant particle can include a sintered ceramic material, a size of about 80 mesh to about 10 mesh, and an average largest pore size of less than about 20 microns. Impinging a plurality of the proppant particle under a gas-entrained velocity of about 260 m/s onto a flat mild steel target can result in an erosivity of the target of about 1 to about 100 mg of target material lost due to the impinging per kg of the plurality of the proppant particle impinging the target. Also, a plurality of the proppant particle can lose less than 15% of its conductivity at 20,000 psi after being subjected to 5 cycles of cyclic loading under stresses from about 12,000 psi to about 20,000 psi, when the proppant particle has a specific gravity of about 3.5.

A pack of proppant particles is also disclosed herein. The pack of proppant particles can include a plurality of proppant particles, each proppant particle of the pack can include a sintered ceramic material, a size of about 80 mesh to about 10 mesh, and an average largest pore size of less than about 20 microns. The pack of proppant particles having a particle size of 20-40 mesh can have a long term permeability greater than 130 darcies at a stress of 10,000 psi and a temperature of 250° F., as measured in accord with ISO 13503-5, when the proppant particles have a specific gravity of about 2.7. Impinging the proppant particles under a gas-entrained velocity of about 260 m/s onto a flat mild steel target can result in an erosivity of the target of about 1 to about 100 mg of target material lost due to the impinging per kg of the plurality of the proppant particle impinging the target. Also, the pack can lose less than 15% of its conductivity at 20,000 psi after being subjected to 5 cycles of cyclic loading under stresses from about 12,000 psi to about 20,000 psi, when the proppant particles have a specific gravity of about 3.5.

A method of hydraulic fracturing is also disclosed herein. The method can include injecting a hydraulic fluid into a subterranean formation at a rate and pressure sufficient to open a fracture therein and injecting a fluid containing a proppant particle into the fracture. The proppant particle can include a sintered ceramic material, a size of about 80 mesh to about 10 mesh, and an average largest pore size of less than about 20 microns. Impinging a plurality of the proppant particle under a gas-entrained velocity of about 260 m/s onto a flat mild steel target can result in an erosivity of the target of about 1 to about100 mg of target material lost due to the impinging per kg of the plurality of the proppant particle impinging the target. Also, a plurality of the proppant particle can lose less than 15% of its conductivity at 20,000 psi after being subjected to 5 cycles of cyclic loading under stresses from about 12,000 psi to about 20,000 psi, when the proppant particle has a specific gravity of about 3.5.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
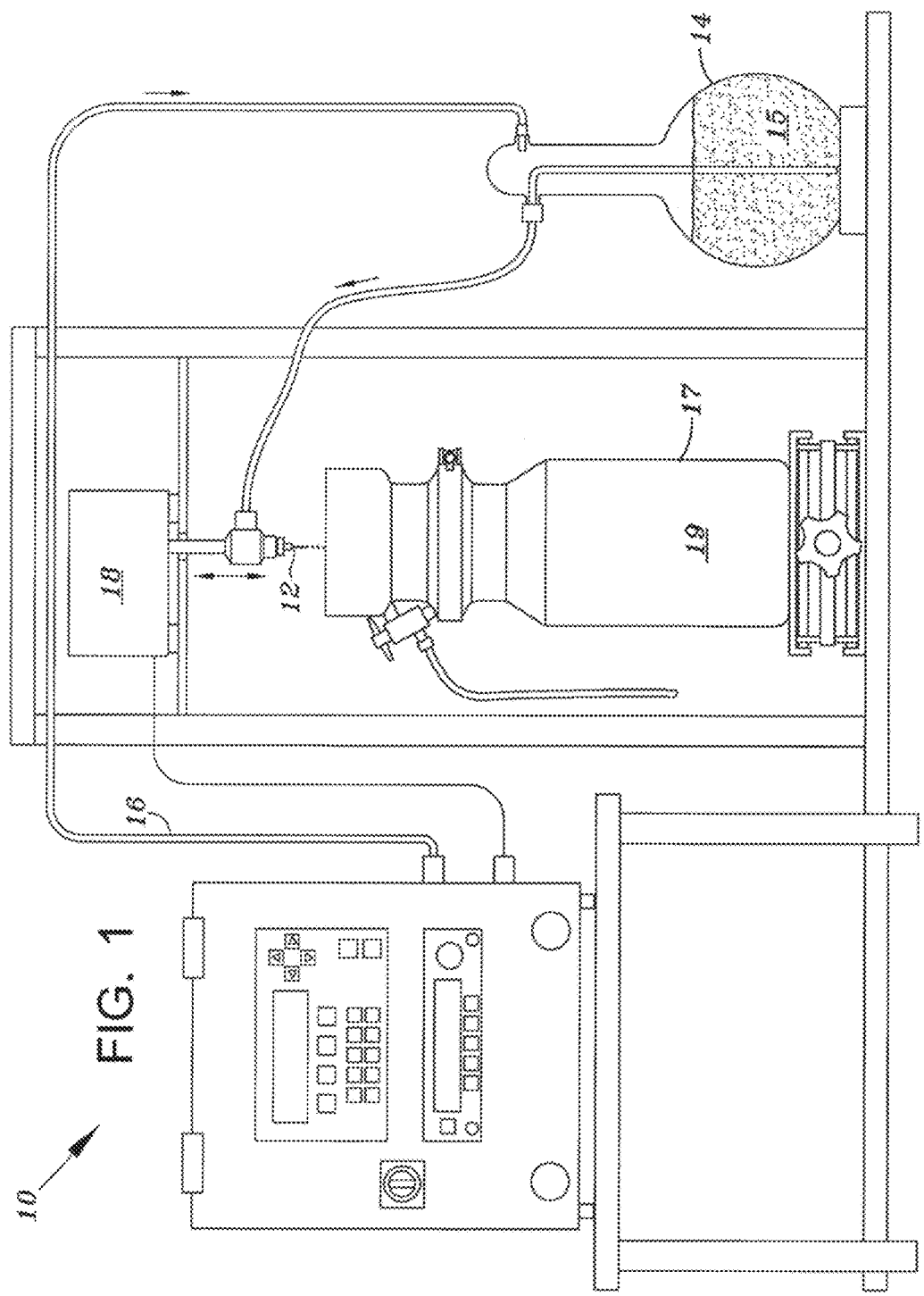
FIG. 1 is a sketch showing the principles of the pellet-forming apparatus for proppant particles disclosed herein.

Referring to FIG. 1, pellet-forming apparatus 10 having a single nozzle is shown to illustrate the principles of the method disclosed herein, which is commonly called "drip casting." Nozzle 12 receives slurry 15 from feed tank 14, which contains the ceramic raw materials suspended in water. Pressure applied to feed tank 14 by pressure supply system 16 causes slurry to flow through nozzle 12 at a selected rate, preferably in laminar flow. Below nozzle 12 is coagulation vessel 17, which receives the droplets. Vibrator unit 18 is connected to nozzle 12 and is used to supply pressure pulses to the nozzle or directly in the slurry flowing to the nozzle. The resulting vibration of the slurry flow through the nozzle causes the stream exiting the nozzle 12 to break into droplets of uniform size. As droplets fall toward coagulation vessel 17, surface tension effects tend to form the droplets into spheres. Spherical particles are formed without the necessity of a sol-gel reaction, reaction gas free fall zone, foamed layer of reaction liquid or reaction liquid directed onto the droplets prior to entering the reaction liquid bath.

Figure 2:
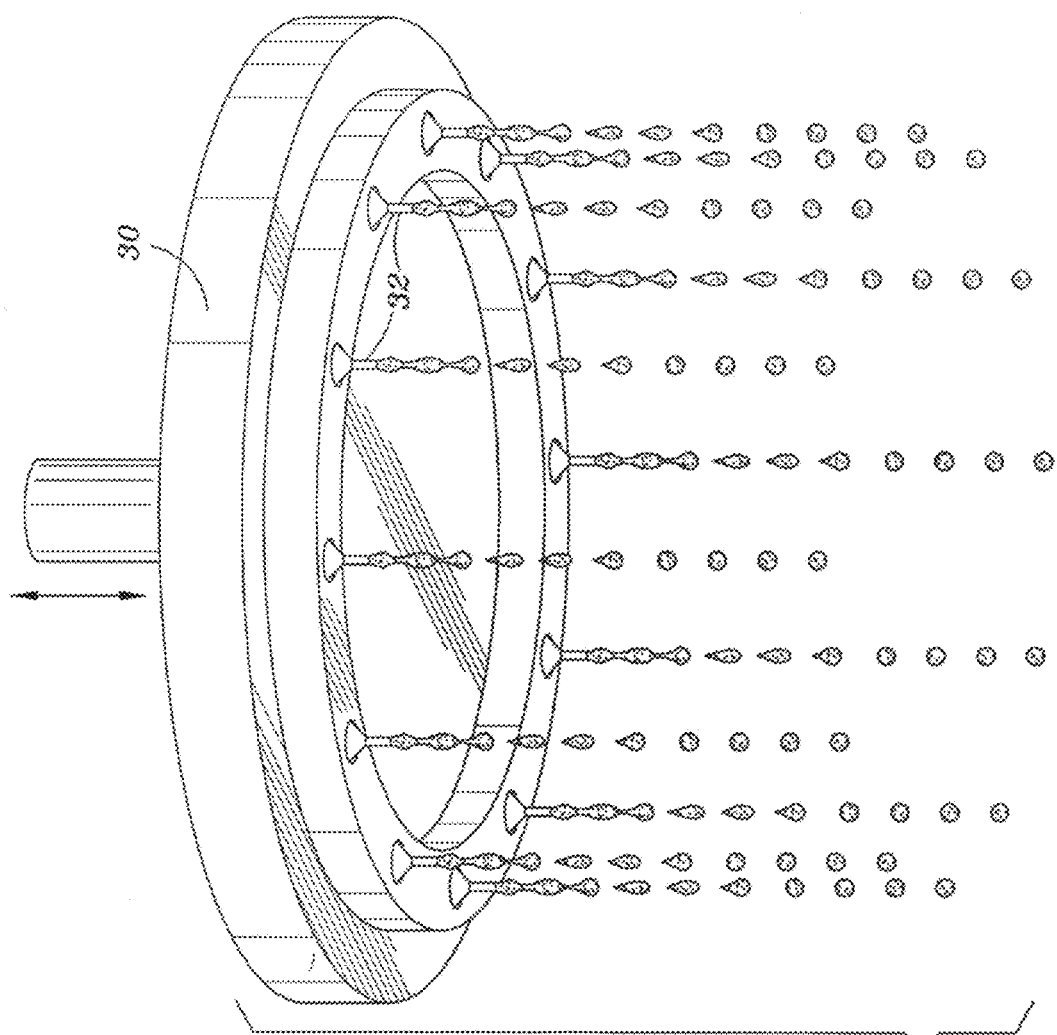
FIG. 2 is a sketch showing a single nozzle forming droplets from a slurry stream.

FIG. 2 shows details of slurry 15 exiting nozzle 12 and breaking into drops. Surface tension of the slurry drives the drops toward minimum surface area, which is acquired in a spherical shape, as they fall toward coagulation vessel 17. The distance of fall is preferably selected to be great enough to allow the droplets to become spherical before entering a liquid in vessel 17.

Slurry 15 from feed tank 14 contains a finely ground (0.01-50 microns in size) mineral or processed powder capable of producing a strong ceramic material after sintering, a proper amount of dispersant necessary for keeping the solid particles in the slurry well separated, water, and a reactant that will react with a component in liquid 19 in coagulation vessel 17 to form a semi-solid or insoluble compound. The solids content of the slurries may range from about 25% to about 75%. The viscosity of the slurries will normally be from 1 to 1,000 centiPoise, but may be higher. Lower viscosity of the slurry aids in improving droplet formation and formation of spherical particles and is an essential part of the invention claimed. Optimization of the dispersant type and concentration will reduce viscosity. Dispersants may be selected based on cost, availability and effectiveness in reducing viscosity of a selected slurry. Dispersants that may be used to reduce the viscosity of slurries include sodium silicate, ammonium polyacrylate, sodium polymethacrylate, sodium citrate, sodium polysulfonate and hexametaphosphate.

The commonly used reactant chemical in the slurry in feed tank 14 is sodium alginate. This is a naturally occurring polysaccharide that is soluble in water as the sodium salt but is cross-linked to form a gel as the calcium salt. Alginate is typically added to the slurry at levels of 0.1% to 1.0% (weight percent alginate solid to total slurry). Coagulation tank 17 normally contains a coagulation liquid 19 which gels the reactant chemical in the slurry 15. The commonly used coagulation liquid for sodium alginate is a calcium chloride solution at concentration levels of 0.5% to 10% by weight. A variety of reactants in the slurry flowing through nozzle 12 and in the coagulation vessel 17 may be used. This may include other polysaccharides and other cross-linking compounds such as polyvinyl alcohol or borate fluids.

The diameter of nozzle 12, the viscosity of slurry 15, the ceramic particle content of slurry 15, pressure to feed the slurry to the nozzle, along with the frequency and amplitude of vibration applied by vibrator source 17 are adjusted to produce droplets having a desired size. These variables are preferably set at a constant value as spheres are produced to be formed into a batch of pellets of propping material. Different batches may be produced having different size pellets. Preferably, each batch will be monosized (i.e., contained on a single sieve such as passing through a 20 mesh sieve but staying on a 25 mesh sieve). The pressure used to feed slurry to the nozzle is adjusted to create laminar flow through the nozzle. The feed pressure can range from 1 to 50 psi. The frequency is adjusted for each set of slurry conditions such that a resonance is established in the slurry stream exiting the nozzle that then produces spherical droplets. The frequency can range from 10 to 20,000 Hz. The pressure and frequency are optimized iteratively to create uniform spherical shapes. The amplitude is adjusted to improve the uniform shape of the spherical droplets formed. The flow rate of the slurry through a nozzle is a function of the nozzle diameter, slurry feed pressure, and the slurry properties such as viscosity and density. For example, for kaolin and alumina slurries through nozzles up to 500 microns in diameter the flow rate per nozzle can range from 0.2 to 3 kg/hr.

The distance between nozzle 12 and the top of the liquid 19 in coagulation vessel 17 is selected to allow droplets to become spherical before reaching the top of the liquid. The distance can be from 1 to 20 cm, but is more typically in the range of 1 to 5 cm so as to reduce distortion of the droplet shape upon impact with the liquid surface, thereby eliminating the need for a reaction gas, foam layer, or tangentially directed reaction liquid prior to the droplets entering the coagulation vessel 17. The reactant chemical in the droplets of slurry reacts with the coagulation liquid 19 in the coagulation vessel 17 and a semi-solid surface is formed on the droplets, which helps retain the spherical shape and prevents agglomeration of the pellets. Preferably, the residence time of pellets in coagulation vessel 17 is sufficient to allow pellets to become rigid enough to prevent deformation of the spherical shape when they are removed and dried, i.e., semi-rigid. In some embodiments, pellets may fall into a coagulation liquid solution flowing vertically upward so that settling of the particle through the liquid will be retarded to produce a longer residence time in the coagulation vessel.

Pellets formed using the apparatus of FIG. 1 are washed to remove excess coagulation agent and conveyed to other devices where they are dried and later sintered, using well known processes in the industry.

Figure 3:
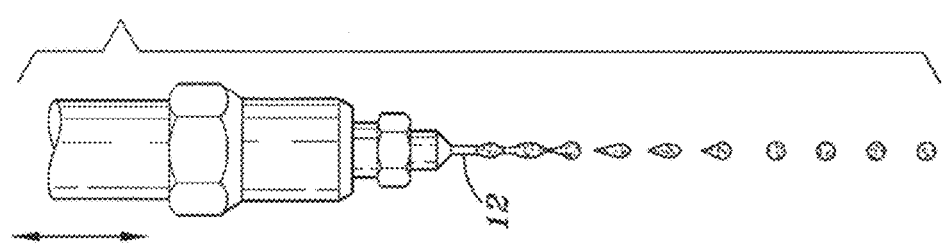
FIG. 3 is a sketch showing a multi-nozzle plate forming droplets from a slurry stream.
Figure 4A:
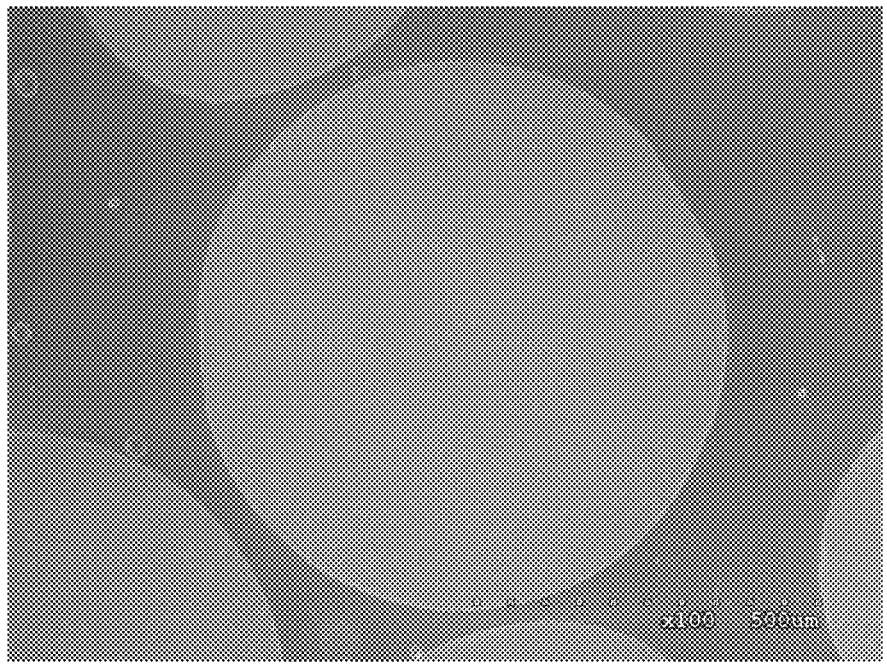
FIG. 4A shows a Scanning Electron Microscope photograph at 100× of sintered pellets of alumina formed by the apparatus of FIG. 1.
Figure 4B:
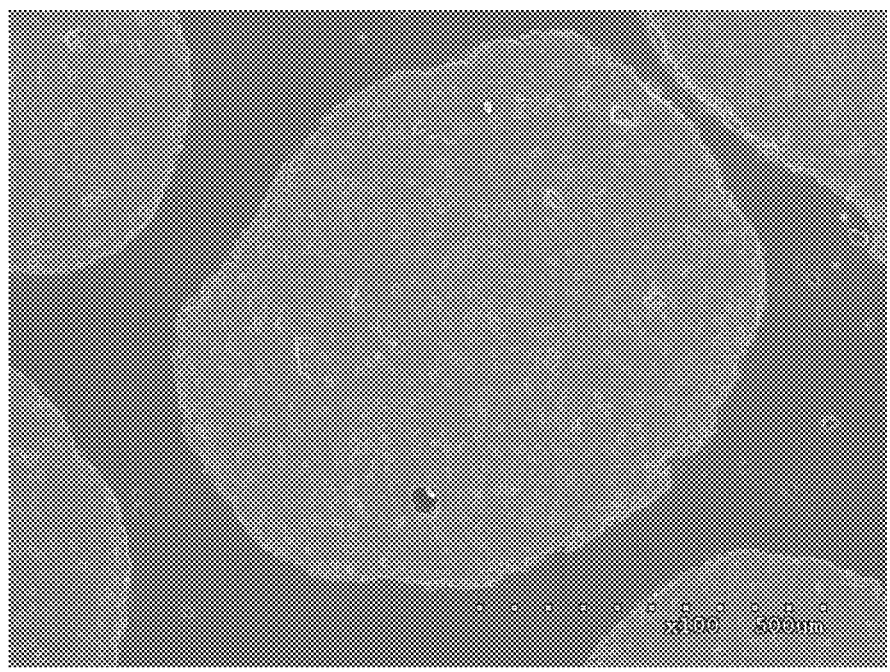
FIG. 4B shows a Scanning Electron Microscope photograph at 100× of sintered pellets of alumina formed by prior art methods.
Figure 4C:
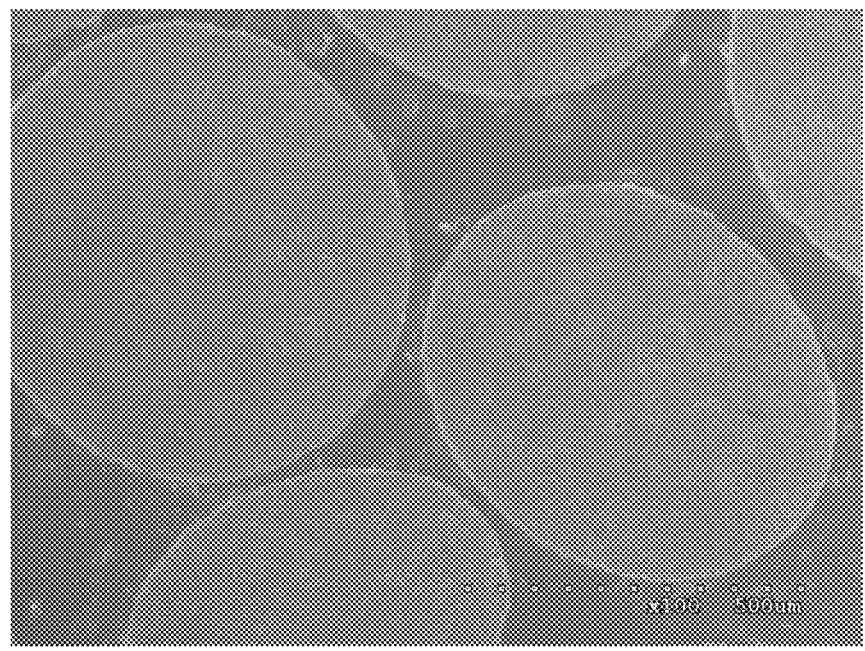
FIG. 4C shows a Scanning Electron Microscope photograph at 100× of sintered pellets of bauxite formed by the apparatus of FIG. 1.
Figure 4D:
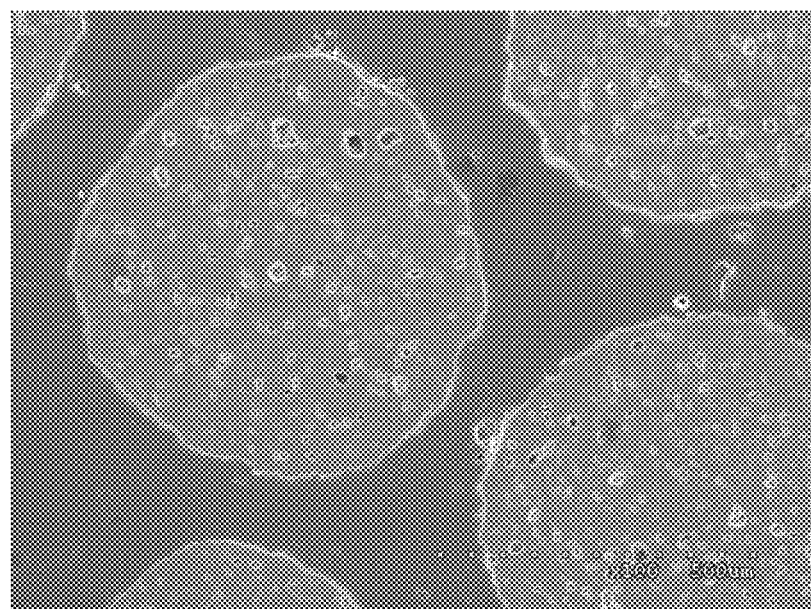
FIG. 4D shows a Scanning Electron Microscope photograph at 100× of sintered pellets of bauxite formed by prior art methods.
Figure 4E:
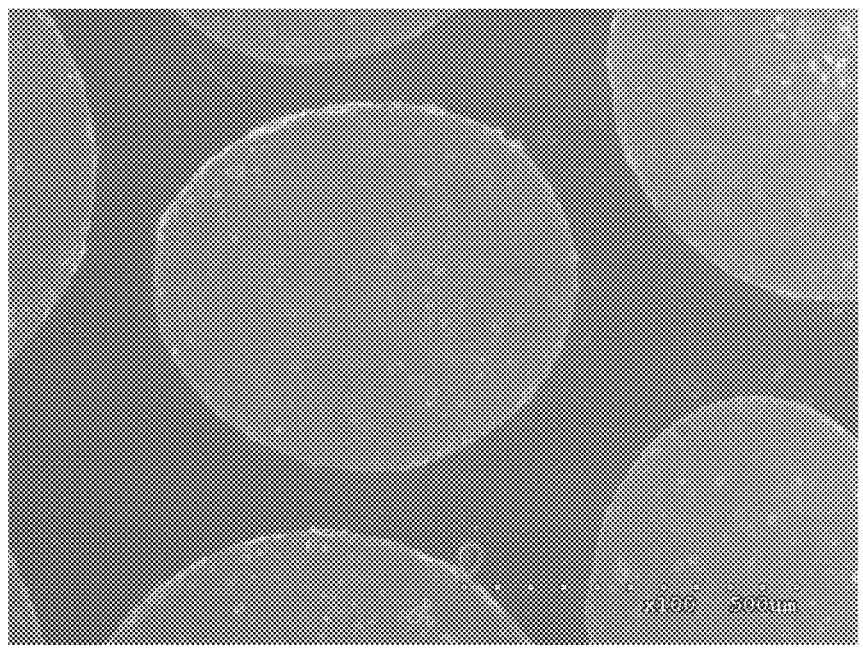
FIG. 4E shows a Scanning Electron Microscope photograph at 100× of sintered pellets of kaolin formed by the apparatus of FIG. 1.
Figure 4F:
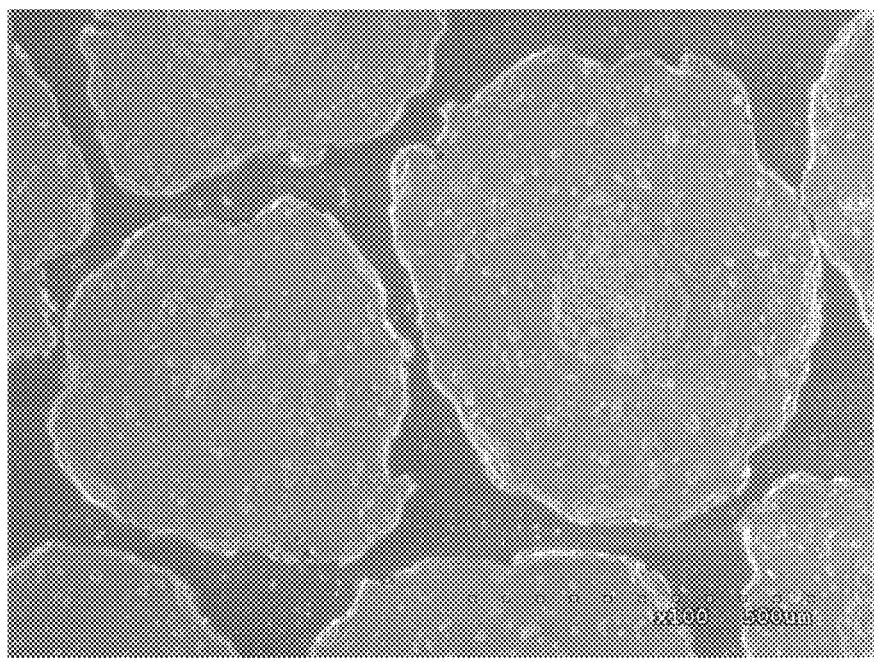
FIG. 4F shows a Scanning Electron Microscope photograph at 100× of sintered pellets of kaolin formed by prior art methods.

FIG. 3 illustrates a multi-nozzle apparatus, which is required to apply the process on a commercial scale. Multiple nozzles 32 are placed in vessel 30, which operates under a controlled pressure to flow slurry through the nozzles. Large numbers of nozzles are required for commercial production of proppant particles. Vessel 30 is vibrated to cause vibration of nozzles, as described above. Alternatively, variable pressure may be induced in the slurry to cause formation of uniform sized droplets. The droplets are collected as described before.

Pellets produced by the process described in FIGS. 1-3 are near uniform in size. For example, Table 1 compares the pellet size distributions for sintered alumina proppant produced by the dry mixing process and by the drip casting process described herein, without screening of the green pellets. Without screening of the green pellets, dry mixing produces fired proppant with a distribution across six screens, whereas drip casting produces fired proppant substantially on one screen. Therefore, in a manufacturing process for proppant, drip casting does not require sieving the green pellets to select the size range desired and then recycling the material in green pellets outside the selected size range. The size pellets to be sintered into proppant are selected by controlling the diameter of nozzle 12 or 32, the viscosity of slurry 15, the ceramic particle content of slurry 15, pressure to feed the slurry to the nozzle, along with the frequency and amplitude of vibration applied by vibrator source 17. The sintered pellets or proppant particles produced by the process described in FIGS. 1-3 can have any suitable size. The proppant particles produced by the process described in FIGS. 1-3 can have a size of at least about 100 mesh, at least about 80 mesh, at least about 60 mesh, at least about 50 mesh, or at least about 40 mesh. For example, the proppant particles can have a size from about 115 mesh to about 2 mesh, about 100 mesh to about 3 mesh, about 80 mesh to about 5 mesh, about 80 mesh to about 10 mesh, about 60 mesh to about 12 mesh, about 50 mesh to about 14 mesh, about 40 mesh to about 16 mesh, or about 35 mesh to about 18 mesh.

TABLE 1

Sieve Distribution of Sintered Pellets (Proppant Particles) Formed by Dry Mixing and Drip Casting

| | 16 Mesh | 20 Mesh | 25 Mesh | 30 Mesh | 35 Mesh | 40 Mesh | 50 Mesh | Pan |
|---|---|---|---|---|---|---|---|---|
| Dry Mixing | 0% | 17.8% | 23.9% | 24.3% | 18.4% | 10.6% | 4.9% | 0% |
| Drip Casting | 0% | 0% | 0.2% | 99.8% | 0% | 0% | 0% | 0% |

The proppant particles produced by the process described in FIGS. 1-3 can have any suitable composition. The proppant particles can be or include silica and/or alumina in any suitable amounts. According to one or more embodiments, the proppant particles include less than 80 wt %, less than 60 wt %, less than 40 wt %, less than 30 wt %, less than 20 wt %, less than 10 wt %, or less than 5 wt % silica based on the total weight of the proppant particles. According to one or more embodiments, the proppant particles include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to one or more embodiments, the proppant particles include at least about 30 wt %, at least about 50 wt %, at least about 60 wt %, at least about 70 wt %, at least about 80 wt %, at least about 90 wt %, or at least about 95 wt % alumina based on the total weight of the proppant particles. According to one or more embodiments, the proppant particles include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina. In one or more embodiments, the proppant particles produced by the process described in FIGS. 1-3 can include alumina, bauxite, or kaolin, or any mixture thereof. For example, the proppant particles can be composed entirely of or composed essentially of alumina, bauxite, or kaolin, or any mixture thereof. The term "kaolin" is well known in the art and can include a raw material having an alumina content of at least about 40 wt % on a calcined basis and a silica content of at least about 40 wt % on a calcined basis. The term "bauxite" is well known in the art and can be or include a raw material having an alumina content of at least about 55 wt % on a calcined basis.

The proppant particles produced by the process described in FIGS. 1-3 can have any suitable specific gravity. The proppant particles can have a specific gravity of at least about 2.5, at least about 2.7, at least about 3, at least about 3.3, or at least about 3.5. For example, the proppant particles can have a specific gravity of about 2.5 to about 4.0, about 2.7 to about 3.8, about 3.5 to about 4.2, about 3.8 to about 4.4, or about 3.0 to about 3.5.

FIGS. 4(*a-e*) show photographs of alumina, bauxite, and kaolin proppant particles produced by the apparatus of FIG. 1 and by prior art methods. FIG. 4(*a*) shows an alumina proppant particle made by drip casting, as illustrated in FIG. 1, which has high sphericity and a very smooth surface. FIG. 4(*b*) shows an alumina proppant particle made by an Eirich mixer. The surfaces of the particles are rough and the shapes are generally oblate. FIG. 4(*c*) shows a bauxite proppant particle made by drip casting and FIG. 4(*d*) shows a bauxite proppant particle made by a commercial prior art process using an Eirich mixer (CARBO HSP®, sold by CARBO Ceramics Inc., Houston, Tex.). FIG. 4(*e*) shows a kaolin proppant particle made by drip casting and FIG. 4(*f*) shows a kaolin proppant particle made by a pilot scale fluidized bed process.

The proppant particles produced by the process described in FIGS. 1-3 can have any suitable surface roughness. The proppant particles can have a surface roughness of less than 5 μm, less than 4 μm, less than 3 μm, less than 2.5 μm, less than 2 μm, less than 1.5 μm, or less than 1 μm. For example, the proppant particles can have a surface roughness of about 0.1 μm to about 4.5 μm, about 0.4 μm to about 3.5 μm, or about 0.8 μm to about 2.8 μm.

The surface roughness of each whole proppant particle shown in FIGS. 4(*a-f*) was measured. A smooth, convex perimeter was drawn around each proppant particle, establishing an average surface level that mimicked the actual proppant particle surface as closely as possible while still remaining convex. Then the separation between the actual surface and the smooth, average surface was measured around the entire perimeter at intervals of 100 μm at 100× magnification used in FIG. 4, the separation could be measured with a precision of about 0.5 μm. The average of the measurements from the entire perimeter is representative of the surface roughness of the proppant particle. Table 2 shows that proppant particles formed by dry mixing and spray fluidized bed have surface roughness from three to seven times as large as their drip cast counterparts.

TABLE 2

Surface Roughness of Drip Cast and Conventionally-Formed Proppant Particles

| | Average Surface Roughness (μm) |
|---|---|
| Drip Cast Alumina (FIG. 4a) | 1.4 |
| Dry Mixing-Formed Alumina (FIG. 4b) | 5.8 |
| Drip Cast Bauxite (FIG. 4c) | 1.6 |
| Dry Mixing-Formed Bauxite (FIG. 4d) | 4.9 |
| Drip Cast Kaolin (FIG. 4e) | 0.8 |
| Spray Fluid Bed-Formed Kaolin (FIG. 4f) | 5.7 |

Figure 5:
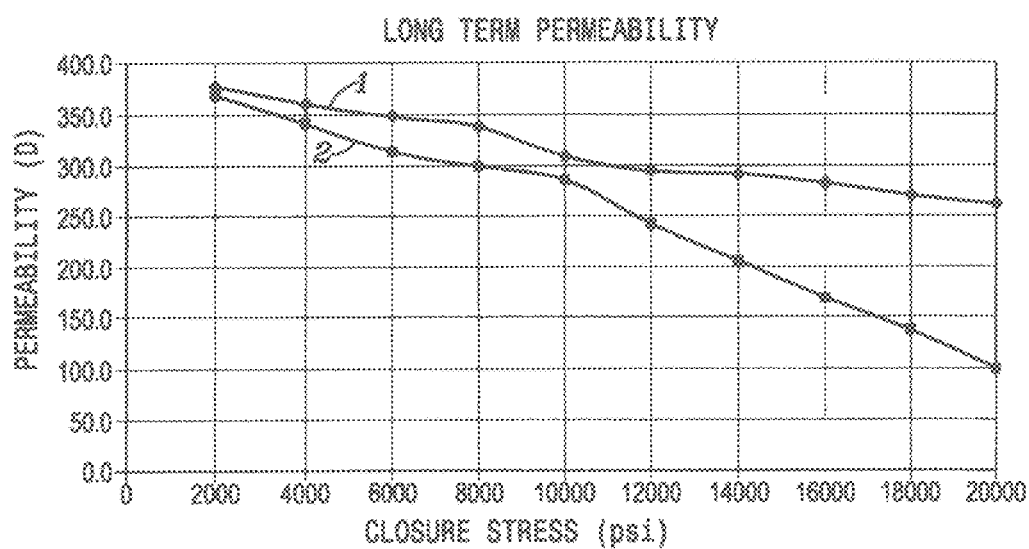
FIG. 5 is a graph of long term permeability as a function of stress of alumina pellets formed by the pellet-forming apparatus disclosed herein and by the prior art dry mixing process using an Eirich mixer.

FIG. 5 compares the permeability of proppant particles formed in the apparatus of FIG. 1 compared with proppant particles formed by the dry mixing process. The proppant particles from the two processes are identical in size and composition, both being a high purity (99+%) alumina. The only variable is the pellet formation process. The permeabilities were measured in accordance with ISO 13503-5: "Procedures for Measuring the Long-term Conductivity of Proppants," except that steel wafers were used rather than sandstone wafers. The long term conductivity apparatus described in ISO 13503-5 utilizes a steel conductivity cell that contains an internal slot of dimensions 7 inches in length by 1.5 inches in width. An open port is placed in the cell extending from the each end of the slot to the exterior of the cell to allow for fluid flow through the slot. Other ports are placed along the length of the slot also extending to the exterior of the cell for the measurement of the internal pressure of the slot. Into this slot are fitted a lower and upper piston, the lengths which extend out beyond the dimensions of the cell such that a load may be applied directly to the pistons by a hydraulic load frame. To load the conductivity cell for the measurement of conductivity the lower piston is first secured into the cell so as not to obstruct the fluid or pressure ports. A seal ring is installed to prevent pressure or fluid leakage between slot and the piston wall. A slot sized metal shim and a sandstone wafer are then placed on the lower piston. Alternatively a steel wafer may replace the sandstone wafer (as was the case here). A set amount of proppant is then placed on the wafer. In this case equal volumes of the two proppants were loaded representing initial pack widths of about 0.19 inches. The proppant is leveled. Then on top of the proppant is placed a second steel wafer, metal shim, seal ring, and the upper piston. An initial load is applied to the pistons and fluid is flowed through the proppant pack while pressure is measured. The temperature of the fluid and cell was maintained at 250° F. Measurement of the rate of fluid flow and pressure loss provides a measure of the proppant pack conductivity in millidarcy-feet. The permeability of the proppant pack is calculated by dividing the conductivity by the measured width of the pack, which was about 0.16-0.19 inch for the data shown in FIG. 5. The flowing fluid was a silica saturated deoxygenated aqueous solution of 2% KC1. Conductivity was measured at stresses of 2,000 psi to 20,000 psi in increments of 2,000 psi. In each case the stress was held for 50 hours before measuring the conductivity. Permeability of a proppant pack decreases as closure stress increases due to failure of the proppant grains. Stronger pellets will result in a higher permeability. As can be seen in FIG. 5, proppant particles made by dry mixing (line 2) lose 78% of their permeability as the closure stress increases from 2,000 psi to 20,000 psi. By contrast the proppant particles made from the apparatus in FIG. 1 (line 1) lose only 31% of their permeability—less than one half of the permeability loss of the proppant particles made by dry mixing. This higher permeability of the proppant particles made from the apparatus of FIG. 1 is due to the improved strength of the proppant particle.

The proppant particles formed by the drip cast methods disclosed herein can have any appropriate permeability. Proppant particles formed by the drip cast methods and having a specific gravity of about 2.7 can have a long term permeability greater than about 130 darcies, about 150 darcies, about 170 darcies, about 190 darcies, about 195 darcies, about 200 darcies, about 225 darcies, or about 250 darcies at a stress of 10,000 psi and a temperature of 250° F., as measured in accord with ISO 13503-5. Proppant particles formed by the drip cast methods and having a specific gravity of about 3.3 can have a long term permeability greater than about 110 darcies, about 120 darcies, about 130 darcies, about 140 darcies, about 150 darcies, about 155 darcies, about 165 darcies, or about 170 darcies at a stress of 14,000 psi and a temperature of 250° F., as measured in accord with ISO 13503-5. Proppant particles formed by the drip cast methods and having a specific gravity of about 3.5 can have a long term permeability greater than about 80 darcies, about 90 darcies, about 100 darcies, about 110 darcies, about 115 darcies, about 120 darcies, about 130 darcies, about 140 darcies, about 150 darcies, about 160 darcies, about 170 darcies, or about 185 darcies at a stress of 20,000 psi and a temperature of 250° F., as measured in accord with ISO 13503-5.

The proppant particles formed by the drip cast methods disclosed herein can have any appropriate strength. An appropriate strength can include a decrease of less than 85%, less than 80%, or less than 75% of long term liquid permeability, as measured in accord with ISO 13503-5 at 250° F., of a pack of test particles, the test particles having the same composition and method of making as the proppant particles, when a stress applied to the pack of test particles increases from 2,000 psi to 12,000 psi and the test particles are in the size range of 20-40 mesh and have a specific gravity of about 2.7. An appropriate strength can also include a decrease of less than 75%, less than 65%, or less than 55% of long term liquid permeability, as measured in accord with ISO 13503-5 at 250° F., of a pack of test particles, the test particles having the same composition and method of making as the proppant particles, when a stress applied to the pack of test particles increases from 2,000 psi to 14,000 psi and the test particles are in the size range of 20-40 mesh and have a specific gravity of about 3.3. An appropriate strength can also include a decrease of less than 90%, less than 80%, less than 75%, less than 70%, less than 65%, or less than 60% of long term liquid permeability, as measured in accord with ISO 13503-5 at 250° F., of a pack of test particles, the test particles having the same composition and method of making as the proppant particles, when a stress applied to the pack of test particles increases from 12,000 psi to 20,000 psi and the test particles are in the size range of 20-40 mesh and have a specific gravity of above about 3.5.

The strength of a proppant particle can be indicated from the proppant crush resistance test described in ISO 13503-2: "Measurement of Properties of Proppants Used in Hydraulic Fracturing and Gravel-packing Operations." In this test a sample of proppant is first sieved to remove any fines (undersized pellets or fragments that may be present), then placed in a crush cell where a piston is then used to apply a confined closure stress of some magnitude above the failure point of some fraction of the proppant particles. The sample is then re-sieved and weight percent of fines generated as a result of proppant particle failure is reported as percent crush. A comparison the percent crush of two equally sized samples is a method of gauging the relative strength. For the two samples of proppant particles used in the conductivity test described above the weight percent crush at 15,000 psi of the proppant particles produced by dry mixing was 2.7% as compared to 0.8% for the drip cast proppant particles. This again indicates that drip casting produces a stronger proppant particles.

Relative proppant strength can also be determined from single proppant particle strength measurements. Strength distributions of forty proppant particles from each of the two samples of proppant used in the conductivity test described above were measured, tabulated, and analyzed using Weibull statistics for the determination of a characteristic strength. The characteristic strength of the drip cast proppant particles so determined was 184 MPa as compared to 151 MPa for the proppant particles made by dry mixing.

The proppant particles formed by the drip cast methods disclosed herein can have any suitable pore size distribution. For example, the proppant particles can have a standard deviation in pore size of less than 6 µm, less than 4 µm, less than 3 µm, less than 2.5 µm, less than 2 µm, less than 1.5 µm, or less than 1 µm. The proppant particles formed by the drip cast methods disclosed herein can have any suitable average maximum or largest pore size. For example, the proppant particles can have an average largest pore size of less than about 25 µm, less than about 20 µm, less than about 18 µm, less than about 16 µm, less than about 14 µm, or less than about 12 µm. The proppant particles formed by the drip cast methods disclosed herein can have any suitable concentration of pores. For example, the proppant particles can have less than 5,000, less than 4,500, less than 4,000, less than 3,500, less than 3,000, less than 2,500, or less than 2,200 visible pores at a magnification of 500× per square millimeter of proppant particulate.

Fracture mechanics teaches that particles fail under stress from the largest flaw in the particle. In proppant particles, the largest flaw is believed to be the largest pore. Therefore, the stress at failure is inversely proportional to the square root of the size of the largest flaw. So, the ratio (R) of the stress at failure of a drip cast proppant (DC) formed by the apparatus disclosed herein to a conventionally (CONV) made proppant (dry mixing or spray fluid bed processes) would be:

$$R = (\text{Max pore size}_{DC}/\text{Max pore size}_{CONV})^{1/2}$$

Proppant particles made by the drip casting process and prior art processes were examined by a scanning electron microscope (SEM) at a magnification of 500×. To measure pore size distribution in particles, cross-sections of alumina, bauxite and kaolin proppant particles made by each process were examined in the SEM. For each sample, a random area of approximately 252 µm×171 µm from each of ten different pellets was photographed. The ten largest pores in each area were measured and the equation above was used to calculate the theoretical ratio of stress at failure of drip cast proppant particles versus conventionally made proppant particles. The results are presented in Table 3. For example, the average maximum pore size in the drip cast alumina proppant particles was 16.3 µm and for the dry mixing process alumina proppant particles average maximum pore size was 40.8 µm. Using the equation above, the ratio of the stress to failure of the drip cast proppant particles to the dry mixing process proppant particles is 1.6. Thus fracture mechanics predicts that drip cast high alumina proppant particles should withstand approximately 1.6 times more stress without fracturing than dry mixing process made proppant particles.

TABLE 3

Pore Sizes of Proppant Particles Formed by
Drip Casting, Dry Mixing and Spray Fluid Bed

|  | Alumina | | Bauxite | | Kaolin | |
|---|---|---|---|---|---|---|
|  | Drip Cast | Dry Mixed | Drip Cast | Dry Mixed | Drip Cast | Dry Mixed |
| Average Largest Pore (μm) | 16.3 | 40.8 | 14.3 | 37.5 | 11.1 | 56.0 |
| Average of 10 Largest Pores (μm) | 10.4 | 19.1 | 9.1 | 20.5 | 6.0 | 18.4 |
| Theoretical Ratio of Drip Cast Strength to Conventional Strength (μm) | 1.6x | | 1.6x | | 2.2x | |

Figure 6:
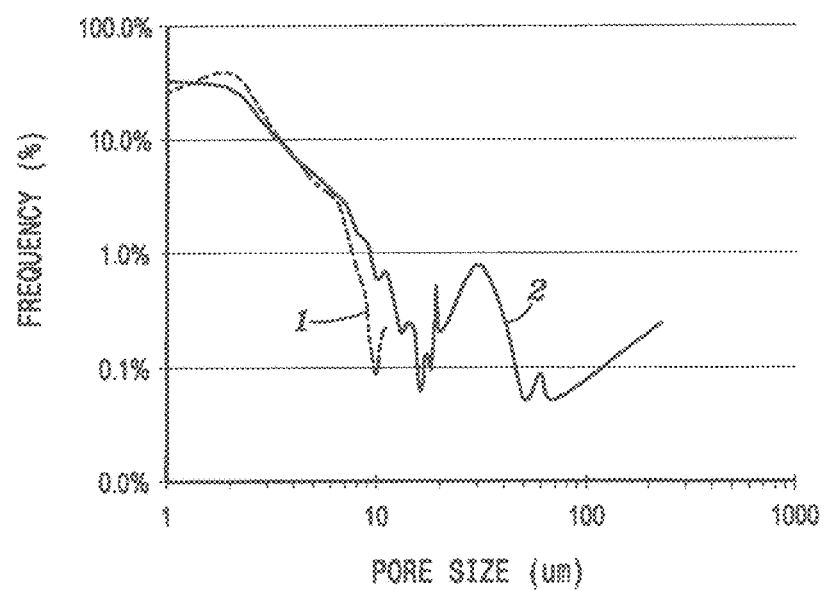
FIG. 6 is a frequency plot of pore size for proppant particles of kaolin made by the method disclosed herein and by the prior art spray fluidized bed method.

Additional measurements were carried out on the kaolin samples. In these, every visible pore was measured and the composite data from all ten areas was used to calculate average pore size, standard deviation in pore size, and number of pores per square millimeter, as well as the largest pore data, which are presented in Table 3. A summary of the data is presented in Table 4, and FIG. 6 shows plots of the pore size distributions for drip cast kaolin (Curve 1) and spray fluid bed kaolin (Curve 2). The small percentage of very large pores generated by the spray fluid bed process shown in FIG. 6 (Curve 2) is readily visible in the microstructures in FIG. 4f. The lack of large pores in the drip cast material provides the strength advantage discussed above.

TABLE 4

Additional Pore Size Measurements for
Drip Cast and Spray Fluid Bed Kaolin

|  | Drip Cast Kaolin | Spray Fluid Bed Kaolin |
|---|---|---|
| Average Pore Size (μm) | 2.0 | 2.8 |
| Standard Deviation in Pore Size (μm) | 1.8 | 6.4 |
| Average Number of Pores Per Square Millimeter | 2121 | 5133 |

Proppant made from kaolin has a cost advantage over proppant containing higher alumina contents, which are made from higher-cost ores containing higher percentages of alumina. Four proppant products having three ranges of alumina content are sold by Carbo Ceramics, for example (data from www.carboceramics.com, searched Dec. 19, 2011). Higher alumina content proppants generally sell for higher prices and cost more to manufacture. The lowest alumina contents are in the products ECONOPROP and CARBOLITE, in which the alumina content is about 48 and 51 percent, respectively. A higher alumina content is in CARBOPROP, in which the alumina content is about 72 percent. The CARBOPROP is a more expensive product to make primarily because of higher raw material costs.

Figure 7:
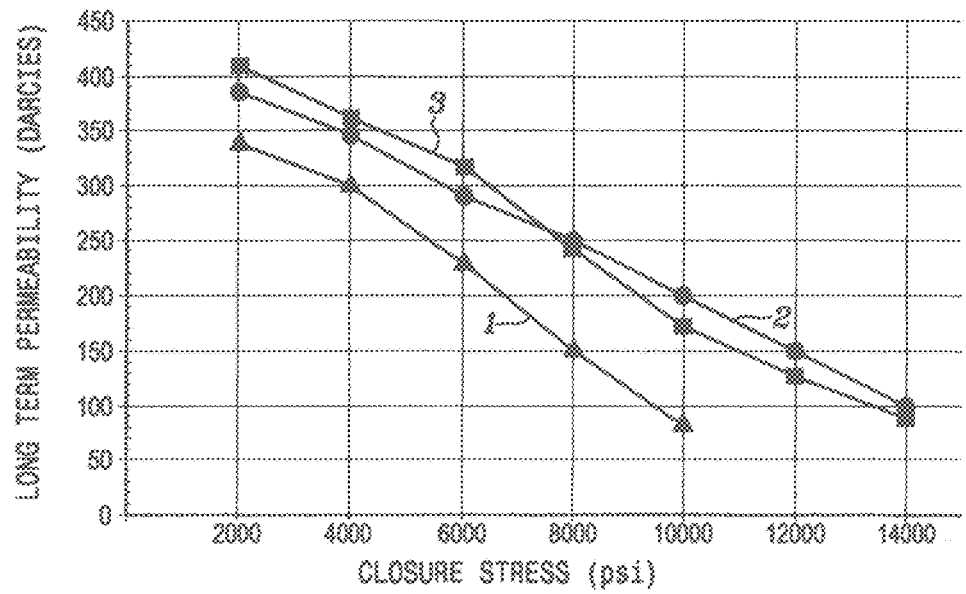
FIG. 7 is a graph of long term permeability as a function of stress of proppant formed from kaolin and other materials and having different alumina contents formed by the pellet-forming apparatus disclosed herein and by the prior art dry mixing process using an Eirich mixer.

The property of a proppant that is most directly related to its performance in hydraulic fractures is permeability under stress. Long-term permeability data for pure alumina proppant made by a prior art method and by the drip-casting process disclosed herein are shown in FIG. 5. FIG. 7 shows long-term permeability data, measured using the same procedures as used to obtain the data in FIG. 5, for proppant having different alumina contents and made by different processes. Curve 1 represents published permeability of 20/40 mesh ECONOPROP proppant (made from kaolin, having an alumina content of about 48 percent) made by the Eirich-mixer process described above. Curve 2 represents permeability of 20/40 mesh CARBOPROP proppant (made from a mixture of ores having an alumina content of about 72 percent). Curve 3 represents the average permeability vs stress of 15 samples of proppant (made from kaolin, having an alumina content of about 48 percent) made by the drip cast method disclosed herein. The drip cast process produces a proppant made from kaolin that has about the same permeability under stress as the higher-cost product containing 72 percent alumina. The average long-term permeability measured at 10,000 psi stress of 15 samples was 173 darcies. This is far above the published long-term permeability at 10,000 psi stress (85 darcies) of the commercial proppant (ECONOPROP) having about the same alumina content, as can be seen by comparing Curve 3 and Curve 1.

Figure 8:
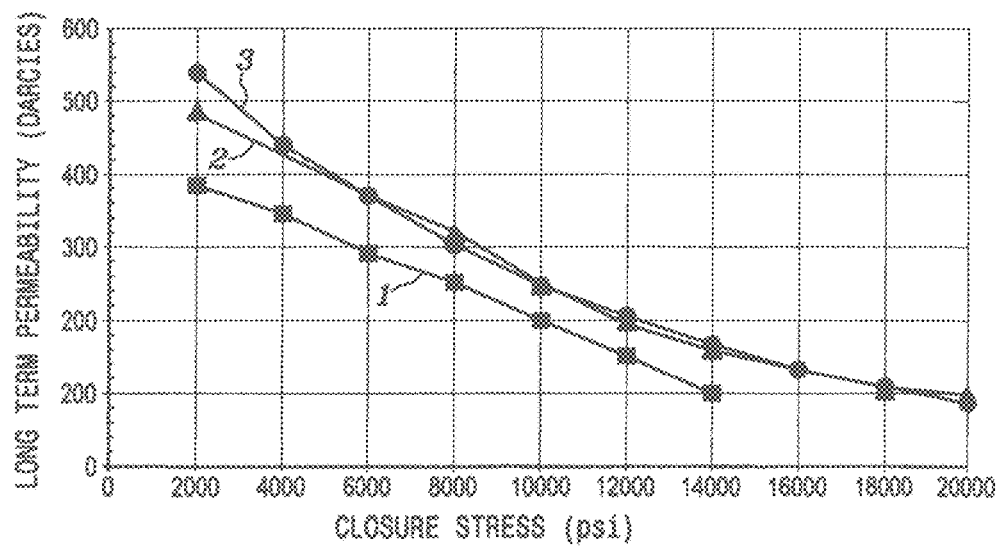
FIG. 8 is a graph of long term permeability as a function of stress of proppant formed from bauxite and other materials and having different alumina contents formed by the pellet-forming apparatus disclosed herein and by the prior art dry mixing process using an Eirich mixer.

FIG. 8 shows long-term permeability data, measured by the same procedures as used to obtain the data in FIGS. 5 and 7, for proppant having different alumina contents and made by different processes. Curve 1 represents published permeability data for 20/40 mesh CARBOPROP proppant formed by the Eirich mixer process described above (made from a mixture of ores having an alumina content of about 72 percent). Curve 2 represents permeability data for proppant (primarily sieved on a 25-mesh screen) made by the drip cast method disclosed herein using bauxite with an alumina content of 70 percent. Curve 3 represents permeability data for 20/40 mesh proppant made by the Eirich mixer process and having an alumina content of about 83 percent alumina. The permeability of the proppant made by the drip cast method and having an alumina content of only 70 percent exhibits practically the same permeability behavior as the prior art proppant made with an Eirich mixer and having about 83 percent alumina. Since alumina is a more expensive component of proppants, there is considerable saving by using lower cost raw materials and the drip cast process disclosed herein. Comparison of Curves 1 and 2 shows the benefits of the drip cast process with about the same alumina content in the proppant.

Methods of hydraulic fracturing using the proppant particulates disclosed herein are also provided. The methods can include injecting a hydraulic fluid into a subterranean formation at a rate and pressure sufficient to open a fracture therein and injecting the proppant particulates disclosed herein into the fracture of the subterranean formation. Downhole tools and equipment in place during fracturing operations oftentimes erode due at least in part to proppant particles impinging onto the metallic surfaces of the downhole tools and equipment when injected during the hydraulic fracturing operation. These proppant particles oftentimes travel at high velocities, sufficient to damage or destroy the downhole tools and equipment. These downhole tools and equipment include, but are not limited to, the well casing, measurement tools, bridge plugs, frac plugs, setting tools, packers, and gravel pack and frac-pack assemblies and the like. Applicants have discovered that hydraulic fracturing with the proppant produced by the drip cast methods disclosed herein instead of conventionally made proppant particles demonstrates a surprising and unexpected reduction in erosion to the downhole tools and equipment. For example, replacing conventionally made proppant particles with proppant particles made by the drip cast methods disclosed herein can result in at least a 10%, at least a 20%, at least a 30%, at least a 40%, or at least a 50% reduction in erosivity to the downhole tools and equipment under same or similar hydraulic fracturing conditions.

Figure 9:
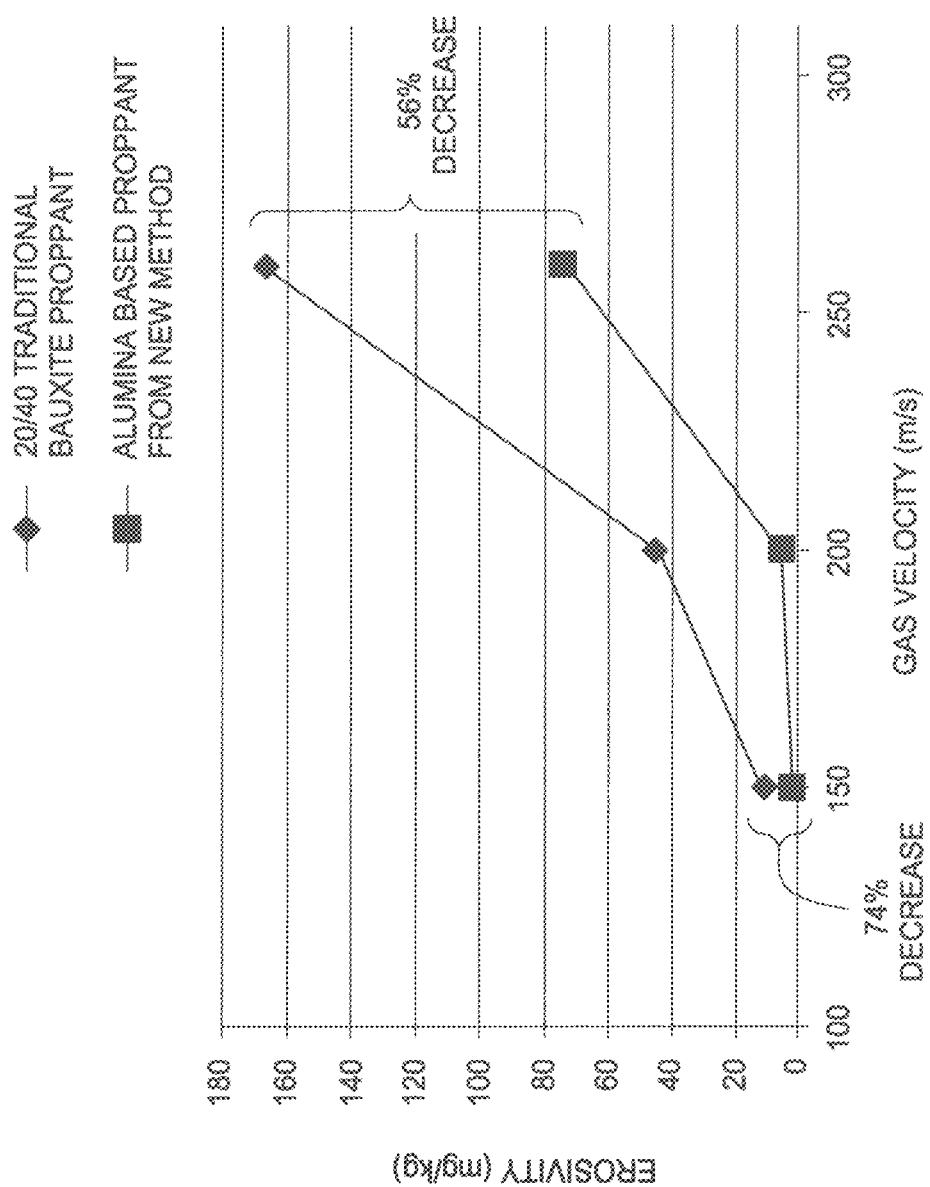
FIG. 9 is a graph of erosivity as a function of proppant velocity for bauxite proppant formed by conventional methods and alumina proppant formed by the drip cast method of FIGS. 1-3.

FIG. 9 is a graph of erosivity as a function of proppant velocity for bauxite proppant formed by conventional methods and alumina proppant formed by the drip cast method of FIGS. 1-3. In this testing the wear of flat targets made of mild steel was measured individually for each proppant at three separate proppant velocities. The proppant was fed into a 20' long tube which had a nitrogen gas stream of set velocity. The proppant was accelerated by the gas stream and would exit the tube 1" from the target at an incident angle of 45 degrees. The proppant was fed in ten separate, 25 gram increments for a total of 250 grams for each test. Three different nitrogen gas velocities were used to evaluate the wear caused by each of the proppant samples. The wear was measured by measuring the weight of the steel targets before and after impact by the proppant samples. Erosivity was expressed as the ratio of the weight loss of the target in milligrams to the weight of proppant impacting the target in kilograms. The results are shown in Table 5. The results show that the use of the proppant particles produced by the drip cast method of FIGS. 1-3 result in a reduction of erosivity of up to about 86%.

TABLE 5

| Sample | Gas velocity (m/s) | Pre-test coupon mass (g) | Post-test coupon mass (g) | Mass loss (g) | Total mass of proppant propelled onto coupon (g) | Erosivity (mg/kg) |
|---|---|---|---|---|---|---|
| Conventional Proppant | 150 | 54.5619 | 54.5592 | 0.0027 | 250 | 10.8 |
|  | 200 | 57.757 | 57.7455 | 0.0115 | 250 | 46 |
|  | 260 | 56.8724 | 56.8306 | 0.0418 | 250 | 167.2 |
| Drip Cast Proppant | 150 | 57.7018 | 57.7011 | 0.0007 | 250 | 2.8 |
|  | 200 | 53.0541 | 53.0525 | 0.0016 | 250 | 6.4 |
|  | 260 | 52.3513 | 52.3327 | 0.0186 | 250 | 74.4 |

Impinging the gas-entrained proppant particles formed by the drip cast methods at a velocity of about 160 meters per second (m/s) onto a flat mild steel target can result in an erosivity of about 0.01 milligrams lost from the flat mild steel target per kilogram of proppant contacting the target (mg/kg), about 0.05 mg/kg, about 0.1 mg/kg, about 0.5 mg/kg, about 1 mg/kg, or about 2 mg/kg to about 5 mg/kg, about 7 mg/kg, about 10 mg/kg, about 12 mg/kg, or about 15 mg/kg. Impinging the gas-entrained proppant particles formed by the drip cast methods at a velocity of about 200 m/s onto the flat mild steel target can result in an erosivity of about 0.01 mg/kg, about 0.05 mg/kg, about 0.1 mg/kg, about 0.5 mg/kg, about 1 mg/kg, or about 2 mg/kg to about 5 mg/kg, about 7 mg/kg, about 10 mg/kg, about 12 mg/kg, or about 15 mg/kg. Impinging the gas-entrained proppant particles formed by the drip cast methods at a velocity of about 260 m/s onto the flat mild steel target can result in an erosivity of about 1 mg/kg, about 5 mg/kg, about 10 mg/kg, about 20 mg/kg, about 40 mg/kg, or about 60 mg/kg to about 65 mg/kg, about 70 mg/kg, about 80 mg/kg, about 90 mg/kg, or about 100 mg/kg.

In the normal operation of hydraulically fractured oil and gas wells the operating pressures occurring in the well can vary significantly. For example, oil and gas wells can cycle from a shut-in condition, in which the pressure within the well is maintained at a maximum, to a producing condition, in which the pressure within the well is much lower. Further, the flowing conditions can change resulting in cycles of a higher or lower pressure within the well. This "pressure cycling" of a hydraulically fractured well is known to cause damage to proppant in the fracture due to rearrangement and re-stressing of the proppant grains. This results in a less conductive proppant pack in the fracture and adversely impacts production performance of the well. Consequently a proppant that is resistant to pressure cycling conductivity loss is desirable.

A pack of the proppant particles formed by the drip cast methods disclosed herein can also have increased conductivity after cyclic loading conditions when compared to a pack of conventionally made proppant particles. For example, a pack of the proppant particles with a specific gravity above 3.5 formed by conventional methods can lose at least 16% of its conductivity at 20,000 psi after being subjected to 5 cycles of cyclic loading under stresses from about 12,000 psi to about 20,000 psi. Also, a pack of the proppant particles with a specific gravity above 3.5 formed by conventional methods can lose at least 10% of its conductivity at 14,000 psi after being subjected to 5 cycles of cyclic loading under stresses from about 6,000 psi to about 14,000 psi. A pack of the proppant particles with a specific gravity above 3.5 formed by the drip cast methods disclosed herein can lose less than 15%, less than 12%, less than 10%, or less than 8% of its conductivity at 20,000 psi after being subjected to 5 cycles of cyclic loading under stresses from about 12,000 psi to about 20,000 psi. Also, a pack of the proppant particles with a specific gravity above 3.5 formed by the drip cast methods disclosed herein can lose less than 10%, less than 8%, less than 6%, less than 4%, less than 2%, less than 1%, or less than 0.1% of its conductivity at 14,000 psi after being subjected to 5 cycles of cyclic loading under stresses from about 6,000 psi to about 14,000 psi.

Figure 10:
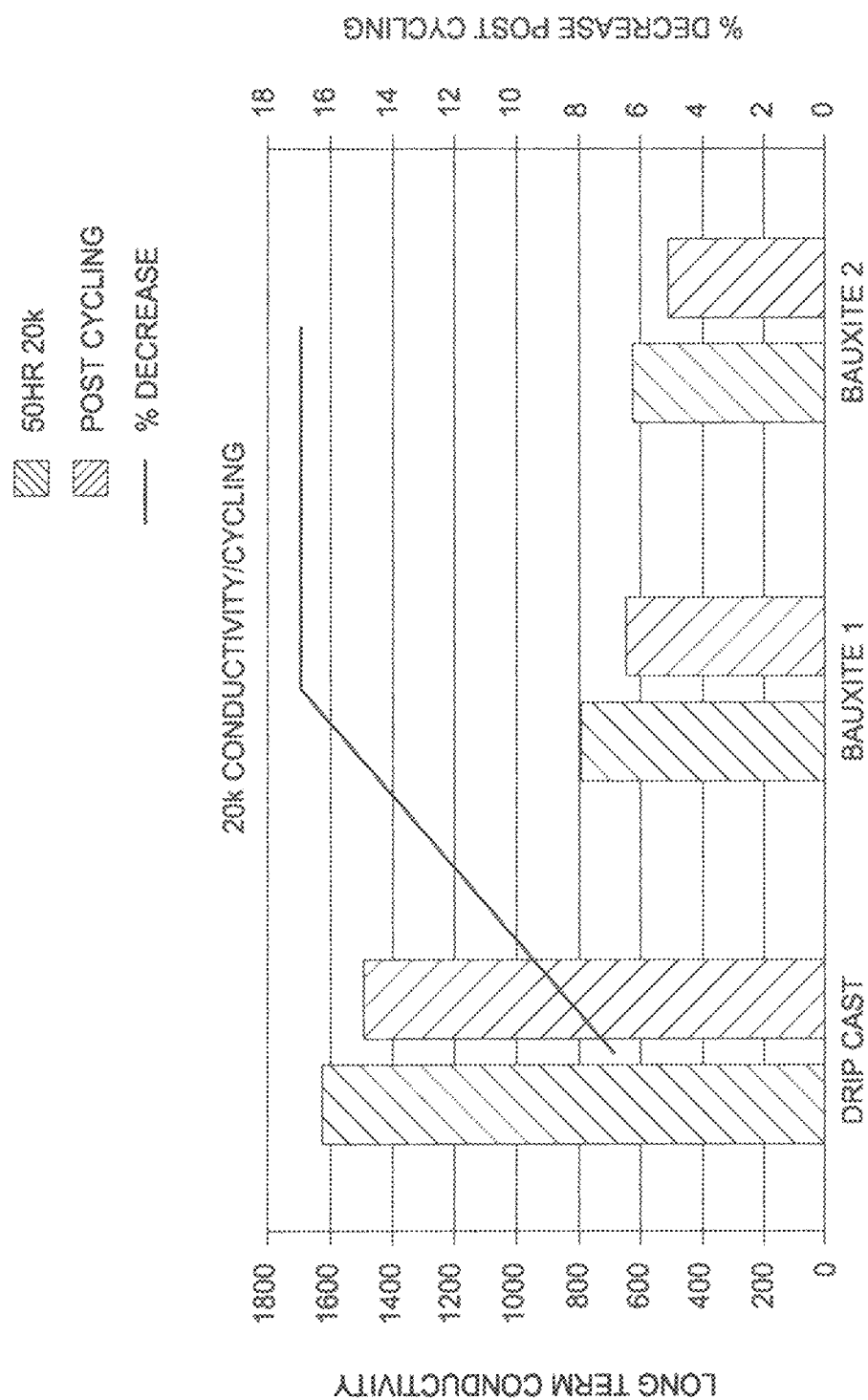
FIG. 10 is a graph showing the long term conductivity of conventional bauxite proppant and drip cast alumina, each of 20/40 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine a decrease in conductivity due to cycling.
Figure 11:
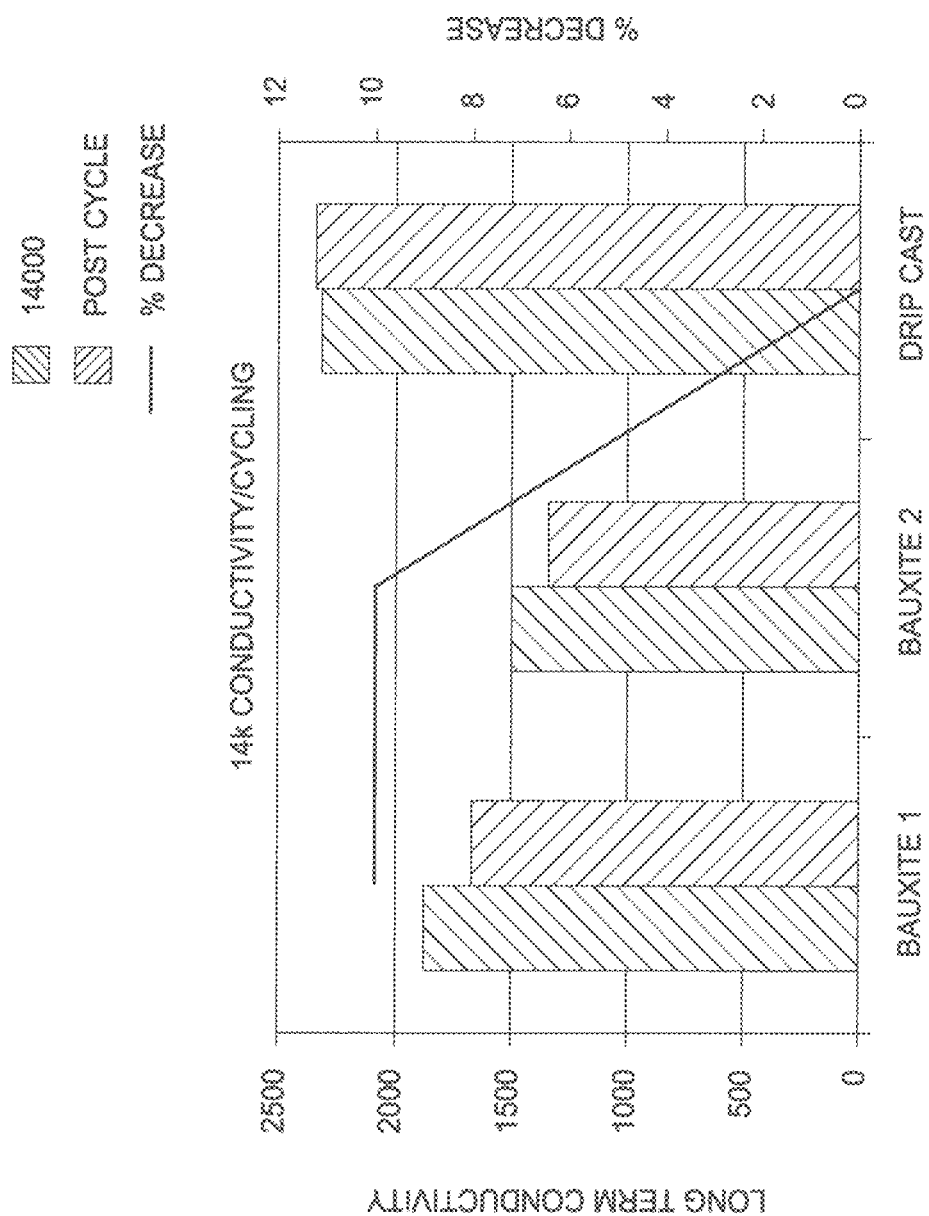
FIG. 11 is a graph showing the long term conductivity of conventional bauxite proppant and drip cast alumina, each of 20/40 mesh sizing, after subjecting each to 50 hours of 14,000 psi closure stress, followed by 5 cycles of cyclic loading under stresses from about 6,000 psi to about 14,000 psi, and finally re-measuring each under 14,000 psi closure stress to determine a decrease in conductivity due to cycling.
Figure 12:
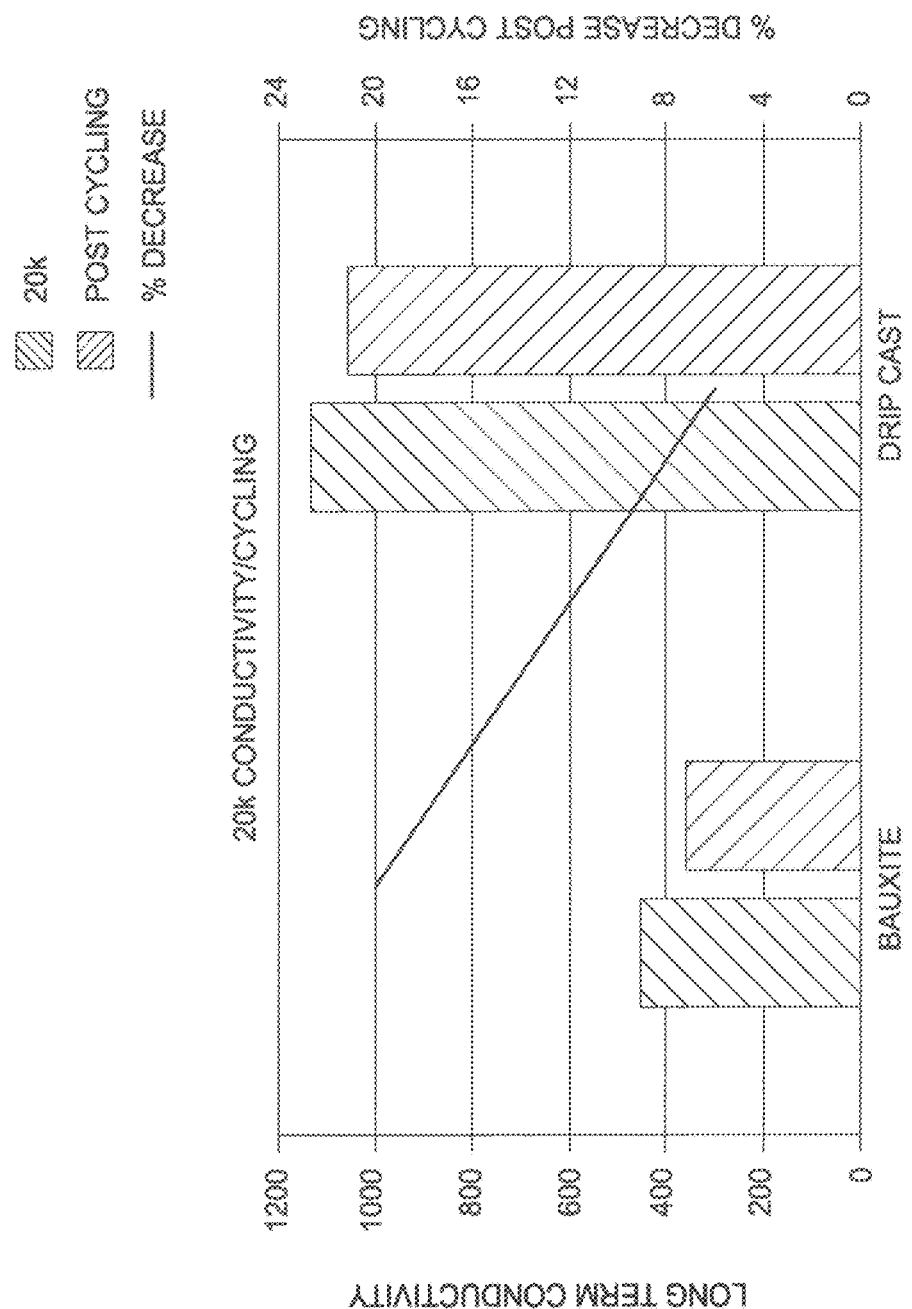
FIG. 12 is a graph showing the long term conductivity of conventional bauxite proppant and drip cast alumina, each of 30/50 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine a decrease in conductivity due to cycling.

FIG. 10 is a graph showing the long term conductivity of conventional bauxite proppant and drip cast alumina, each of 20/40 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine a decrease in conductivity due to cycling. First, it can be observed that the conductivity of the drip cast proppant is substantially greater at 20,000 psi than the two conventional proppants. Second, it can be seen that the drip cast proppant lost only 7% of its conductivity due to the stress cycling whereas the two conventional bauxite proppants lost 17% of their conductivity. Similarly, FIG. 11 is a graph showing the long term conductivity of conventional bauxite proppant and drip cast alumina, each of 20/40 mesh sizing, after subjecting each to 50 hours of 14,000 psi closure stress, followed by 5 cycles of cyclic loading under stresses from about 6,000 psi to about 14,000 psi, and finally re-measuring each under 14,000 psi closure stress to determine a decrease in conductivity due to cycling. First, it can be observed that the conductivity of the drip cast proppant is substantially greater at 14,000 psi than the two conventional proppants. Second, it can be seen that the drip cast proppant exhibited essentially no loss of conductivity due to the stress cycling whereas the two conventional bauxite proppant lost 10% of their conductivity. Also, FIG. 12 is a graph showing the long term conductivity of conventional bauxite proppant and drip cast alumina, each of 30/50 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine a decrease in conductivity due to cycling. First, it can be observed that the conductivity of the drip cast proppant is substantially greater at 20,000 psi than the conventional proppant. Second, it can be seen that the drip cast proppant exhibited 5% loss of conductivity due to the stress cycling whereas the conventional bauxite proppant lost 20%.

The flow of reservoir fluids through the proppant pack in a hydraulic fracture generally occurs at velocities that are much greater than those occurring in the reservoirs. At these very low fluid velocities occurring in the reservoir pressure drops are dominated by viscous flow behavior. This permits the pressure behavior to be adequately described by Darcy's law as shown:

$$\Delta p/L = \mu v/k, \text{ where:}$$

$\Delta pIL$ is the change in pressure per unit length, $\mu$ is the fluid viscosity, v is the fluid velocity and k is the permeability of the pack. However, inertial flow effects dominate the velocities oftentimes found in the fracture and the Forchheimer equation is therefore employed:

$$\Delta p/L = \mu v/k + \beta \rho v^2$$

The first term in the Forchheimer equation is identical to Darcy's law. The Forchheimer equation adds an inertial pressure drop term that includes a velocity squared function, $v^2$, and the density of the fluid, $\rho$. At high velocities this inertial term will dominate the pressure drop and thus dictate fluid flow. Also included in the inertial term is the Forchheimer beta factor, $\beta$. Similar to permeability, the beta factor is an intrinsic property of the porous media that will vary as a function of confining stress. As shown by the Forchheimer equation, pressure change ($\Delta p$) decreases as permeability increases and beta factor decreases. Thus in high fluid velocity conditions, such as those in a propped hydraulic fracture where inertial forces will dominate, a low beta factor will reduce pressure losses in the fracture resulting in higher flow rates.

A pack of the proppant particles formed by the drip cast methods disclosed herein can also have a reduced beta factor after cyclic loading conditions when compared to conventionally made proppant. For example, a pack of the proppant particles formed by conventional methods in the size range of 20/40 mesh can have an increase in beta factor at least 0.0004 at 20,000 psi after being subjected to 5 cycles of cyclic loading under stresses from about 12,000 psi to about 20,000 psi. Also, a pack of the proppant particles formed by conventional methods in the size range of 30/50 mesh can have an increase in beta factor of at least 0.0004 at 20,000 psi after being subjected to 5 cycles of cyclic loading under stresses from about 12,000 psi to about 20,000 psi. A pack of the proppant particles formed by the drip cast methods disclosed herein in the size range of 20/40 mesh can have an increase in beta factor of less than 0.0005, less than 0.0002, less than 0.0001, less than 0.00005, or less than 0.00001 at 20,000 psi after being subjected to 5 cycles of cyclic loading under stresses from about 12,000 psi to about 20,000 psi. Also, a pack of the proppant particles formed by the drip cast methods disclosed herein in the size range of 30/50 mesh can have an increase in beta factor of less than 0.0006, less than 0.0004, or less than 0.0002 at 20,000 psi after being subjected to 5 cycles of cyclic loading under stresses from about 12,000 psi to about 20,000 psi.

Figure 13:
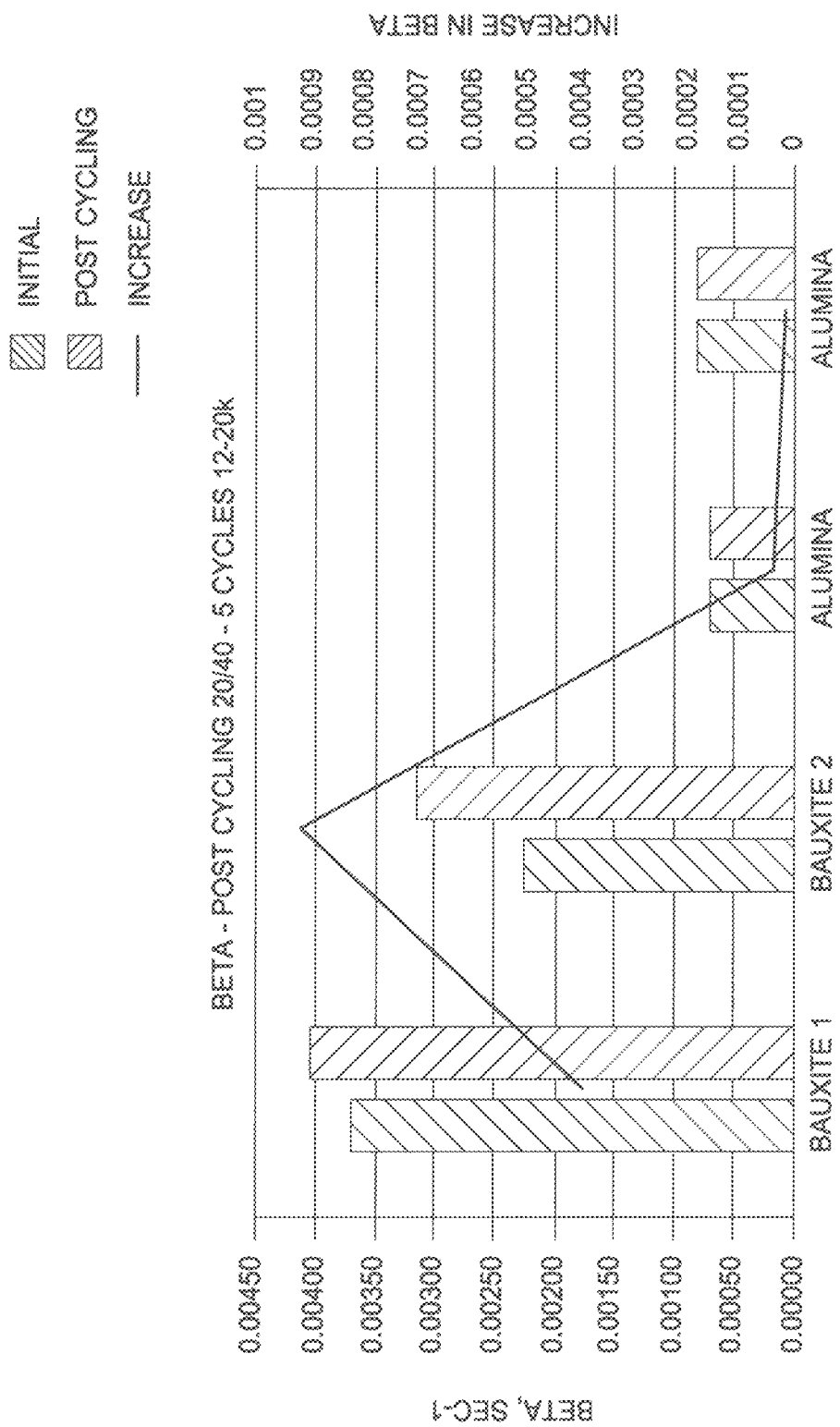
FIG. 13 is a graph showing the beta factors of conventional bauxite proppant and drip cast alumina, each of 20/40 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine an increase in beta factors due to cycling.
Figure 14:
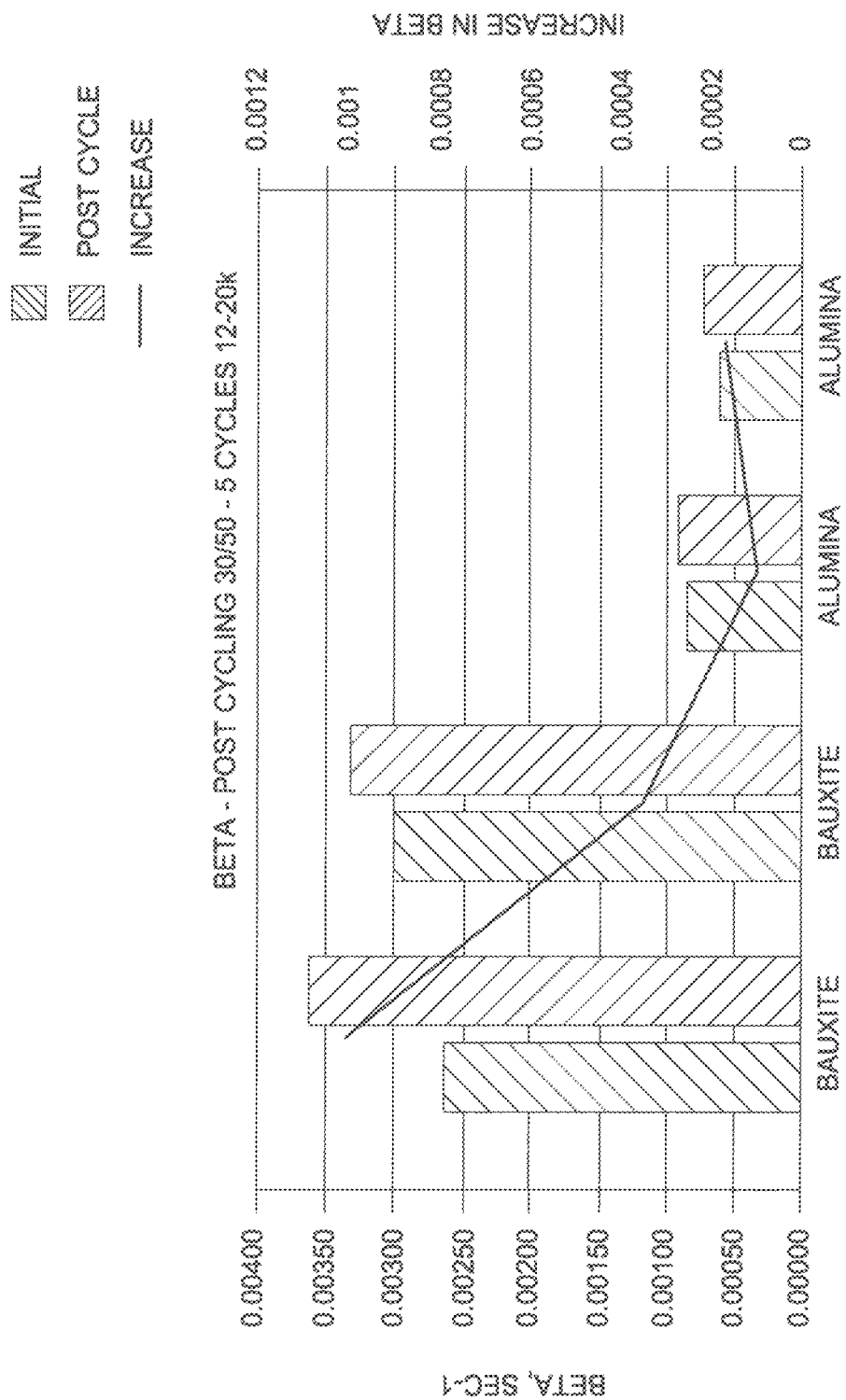
FIG. 14 is a graph showing the beta factors of conventional bauxite proppant and drip cast alumina, each of 30/50 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine an increase in beta factors due to cycling.

FIG. 13 is a graph showing the beta factors of conventional bauxite proppant and drip cast alumina, each of 20/40 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine an increase in beta factors due to cycling. First, it can be observed that the beta factor of the drip cast proppant is substantially lower at 20,000 psi than the two conventional proppants. Second, it can be seen that the beta factor for the drip cast proppant increased only slightly when compared to the increase in post cycling beta factor for the two conventional bauxites. Similarly, FIG. 14 is a graph showing the beta factors of conventional bauxite proppant and drip cast alumina, each of 30/50 mesh sizing, after subjecting each to 50 hours of 20,000 psi closure stress, followed by 5 cycles of cyclic loading under stresses from about 12,000 psi to about 20,000 psi, and finally re-measuring each under 20,000 psi closure stress to determine an increase in beta factors due to cycling. First, it can be observed that the beta factor of the drip cast proppant is substantially lower at 20,000 psi than the two conventional proppants. Second, it can be seen that the beta factor for the drip cast proppant increased only slightly when compared to the increase in beta post cycling for the two conventional bauxites.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A proppant particle comprising a sintered ceramic material and having a size of about 80 mesh to about 10 mesh, an average largest pore size of less than about 20 microns, and a surface roughness of less than about 2 µm.

2. The proppant particle of claim 1, wherein the sintered ceramic material comprises kaolin.

3. The proppant particle of claim 1, wherein the sintered ceramic material comprises bauxite.

4. The proppant particle of claim 1, wherein the sintered ceramic material comprises alumina.

5. The proppant particle of claim 1, wherein when the proppant particle is subjected to impingement under a gas-entrained velocity of about 260 m/s onto a flat mild steel target, the target experiences an erosivity of about 1 mg/kg to about 100 mg/kg.

6. The proppant particle of claim 1, wherein the surface roughness is from about 0.8 µm to about 1.6 µm.

7. The proppant particle of claim 1, wherein the proppant particle has a long-term permeability greater than 130 darcies at a stress of 10,000 psi and a temperature of 250° F., as measured in accord with ISO 13503-5 when the proppant particle has a size of about 20-40 mesh and a specific gravity of about 2.7.

8. The proppant particle of claim 1, wherein the proppant particle has a long-term permeability greater than 110 darcies at a stress of 14,000 psi and a temperature of 250° F., as measured in accord with ISO 13503-5 when the proppant particle has a size of about 20-40 mesh and a specific gravity of about 3.3.

9. The proppant particle of claim 1, wherein the proppant particle has an appropriate strength, appropriate strength being defined as a decrease of less than 85% of long term fluid permeability, as measured in accord with ISO 13503-5 at 250° F., of a pack of test particles, the test particles having the same composition and method of making as the proppant particle, when a stress applied to the pack of test particles increases from 2,000 psi to 20,000 psi and the test particles are in the size range of 20-40 mesh and the test particles have a specific gravity above 3.5.

10. The proppant particle of claim 1, wherein the proppant particle having a size of about 20-40 mesh with a specific gravity above 3.5 loses less than 15% of its long term liquid conductivity at 20,000 psi after being subjected to 5 cycles of cyclic loading under stresses from about 12,000 psi to about 20,000 psi.

11. The proppant particle of claim 1, wherein the proppant particle in a size range of 20-40 mesh with a specific gravity above 3.5 has an increase in beta factor of less than 0.0005 at 20,000 psi after being subjected to 5 cycles of cyclic loading under stresses from about 12,000 psi to about 20,000 psi.

12. A method of hydraulic fracturing a subterranean formation, comprising: injecting a hydraulic fluid into a subterranean formation at a rate and pressure sufficient to open a fracture therein; and
injecting a fluid containing a proppant particle into the fracture, the proppant particle comprising a sintered ceramic material and having a size of about 80 mesh to about 10 mesh, an average largest pore size of less than about 20 microns, and a surface roughness of less than about 2 μm.

13. The method of claim 12, wherein the sintered ceramic material comprises kaolin.

14. The method of claim 12, wherein the sintered ceramic material comprises bauxite.

15. The method of claim 12, wherein the sintered ceramic material comprises alumina.

16. The method of claim 12, wherein the surface roughness is from about 0.8 μm to about 1.6 μm.

17. A proppant particle, comprising:
a ceramic material selected from sintered kaolin;
wherein the proppant particle has a size of about 40 mesh to about 20 mesh and a surface roughness of from about 0.8 μm to less than about 2 μm.

18. The proppant particle of claim 17, wherein the surface roughness is from about 0.8 μm to about 1.6 μm.

19. The proppant particle of claim 17, further comprising a porosity.

20. The proppant particle of claim 19, further comprising a standard deviation in pore size of less than 4 μm.

21. A proppant particle comprising a sintered ceramic material and having a spherical shape, a size of about 80 mesh to about 10 mesh, an average largest pore size of less than about 20 microns, and a surface roughness of less than about 2 μm.

22. The proppant particle of claim 21, wherein the spherical shape is an oblate spheroid.

23. A method of hydraulic fracturing a subterranean formation, comprising:
injecting a hydraulic fluid into a subterranean formation at a rate and pressure sufficient to open a fracture therein; and
injecting a fluid containing the proppant particle of claim 22 into the fracture.

* * * * *